US010693765B2

(12) United States Patent
Eckert et al.

(10) Patent No.: US 10,693,765 B2
(45) Date of Patent: *Jun. 23, 2020

(54) FAILURE PROTECTION FOR TRAFFIC-ENGINEERED BIT INDEXED EXPLICIT REPLICATION

(71) Applicant: Cisco Technology, Inc., San Jose, CA (US)

(72) Inventors: Toerless Eckert, Mountain View, CA (US); Ijsbrand Wijnands, Leuven (BE); Gregory A. Shepherd, Eugene, OR (US); Neale D. R. Ranns, Basingstoke (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,932

(22) Filed: Aug. 30, 2018

(65) Prior Publication Data

US 2019/0020574 A1    Jan. 17, 2019

Related U.S. Application Data

(63) Continuation of application No. 15/054,480, filed on Feb. 26, 2016, now Pat. No. 10,122,614.
(Continued)

(51) Int. Cl.
*H04L 12/761*    (2013.01)
*H04L 12/46*    (2006.01)
(Continued)

(52) U.S. Cl.
CPC .......... *H04L 45/16* (2013.01); *H04L 12/4633* (2013.01); *H04L 45/28* (2013.01);
(Continued)

(58) Field of Classification Search
None
See application file for complete search history.

(56) References Cited

U.S. PATENT DOCUMENTS

| 5,088,091 A | 2/1992 | Schroeder |
| 5,138,615 A | 8/1992 | Lamport ........................ 370/400 |

(Continued)

FOREIGN PATENT DOCUMENTS

| CN | 1726 679 A | 1/2006 | ............. H04L 12/56 |
| CN | 1754 353 | 3/2006 | |

(Continued)

OTHER PUBLICATIONS

Wijnands, Ijsbrand et al., "Bit Indexed Explicit Replication Using Internet Protocol Version 6"; U.S. Appl. No. 15/919,552, filed Mar. 13, 2018 consisting of Specification, Claims, Abstract, and Drawings (49 pages).

(Continued)

*Primary Examiner* — Gregory B Sefcheck
*Assistant Examiner* — Srinivasa R Reddivalam
(74) *Attorney, Agent, or Firm* — Campbell Stephenson LLP

(57) ABSTRACT

Methods and network devices are disclosed for failure protection in traffic-engineered bit indexed explicit replication networks. In one embodiment, a method includes determining a protected link or node in a network, where the protected link or node is included in a designated path to be taken by a message through the network to a destination node, the designated path is encoded in a message bit array carried by the message, and assigned bit positions in the message bit array represent respective network links along the designated path. The method further includes determining a backup path to the destination node from a feeder node adapted to forward a message carrying the message bit array (Continued)

into the protected link or node, and populating an entry in a path update table stored at the feeder node. In one embodiment a network device includes a network interface and a processor configured to carry out the methods.

20 Claims, 14 Drawing Sheets

Related U.S. Application Data

(60) Provisional application No. 62/121,291, filed on Feb. 26, 2015.

(51) Int. Cl.
  *H04L 12/703* (2013.01)
  *H04L 29/06* (2006.01)
  *H04L 12/931* (2013.01)
  *H04L 12/741* (2013.01)
  *H04L 12/751* (2013.01)

(52) U.S. Cl.
  CPC .............. *H04L 69/22* (2013.01); *H04L 45/02* (2013.01); *H04L 45/745* (2013.01); *H04L 49/201* (2013.01)

(56) References Cited

U.S. PATENT DOCUMENTS

| | | | |
|---|---|---|---|
| 5,764,624 A | 6/1998 | Endo | 370/218 |
| 5,999,531 A | 12/1999 | Ferolito | 370/390 |
| 6,032,197 A | 2/2000 | Birdwell | 709/216 |
| 6,130,881 A | 10/2000 | Stiller | 370/238 |
| 6,147,976 A | 11/2000 | Shand | 370/254 |
| 6,148,000 A | 11/2000 | Feldman | 370/394 |
| 6,240,188 B1 | 5/2001 | Dondeti | 380/284 |
| 6,374,303 B1 | 4/2002 | Armitage et al. | 709/242 |
| 6,577,600 B1 | 6/2003 | Bare | 370/238 |
| 6,615,336 B1 | 9/2003 | Chen | 370/351 |
| 6,647,428 B1 | 11/2003 | Bannai et al. | 709/245 |
| 6,771,673 B1 | 8/2004 | Baum | 370/535 |
| 6,778,532 B1 | 8/2004 | Akahane | 370/389 |
| 6,873,627 B1 | 3/2005 | Miller | |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.5 |
| 7,068,654 B1 | 6/2006 | Joseph et al. | 370/392 |
| 7,072,346 B2 | 7/2006 | Hama | 370/395.5 |
| 7,088,721 B1 | 8/2006 | Droz et al. | 370/395.1 |
| 7,111,101 B1 | 9/2006 | Bourke | 326/40 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,281,085 B1 | 10/2007 | Garg | 370/235 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/254 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.5 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,519,733 B1 | 4/2009 | Thubert | 709/232 |
| 7,551,599 B2 | 6/2009 | Levit | 370/254 |
| 7,564,803 B1 | 7/2009 | Minei et al. | 370/254 |
| 7,568,047 B1 | 7/2009 | Aysan | |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,903,554 B1 | 3/2011 | Manur | |
| 7,925,778 B1 | 4/2011 | Wijnands | 370/389 |
| 7,940,695 B1 | 5/2011 | Bahadur et al. | 370/254 |
| 7,983,174 B1 | 7/2011 | Monaghan et al. | 370/242 |
| 8,064,441 B2 | 11/2011 | Wijnands et al. | 370/389 |
| 8,121,126 B1 | 2/2012 | Moisand | |
| 8,131,126 B2 | 2/2012 | Moisand | |
| 8,320,374 B2 | 11/2012 | de Heer | 370/390 |
| 8,325,726 B2 | 12/2012 | Baban et al. | 370/390 |
| 8,339,973 B1 | 12/2012 | Pichumani et al. | 370/248 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,670,146 B1 | 3/2014 | Van Couvering | 358/1.15 |
| 8,711,883 B2 | 4/2014 | Kang | 370/389 |
| 8,774,179 B1 | 7/2014 | Gaggara | 370/389 |
| 8,787,400 B1 | 7/2014 | Barth | 370/419 |
| 8,792,384 B2 | 7/2014 | Banerjee et al. | 370/254 |
| 8,830,826 B2 | 9/2014 | Chen | 370/228 |
| 8,848,728 B1 | 9/2014 | Revah | 370/386 |
| 8,880,869 B1 | 11/2014 | Shah | 713/151 |
| 8,890,903 B2 | 11/2014 | Russell | 345/690 |
| 8,923,292 B2 | 12/2014 | Friskney | |
| 8,942,256 B1 | 1/2015 | Barth | 370/255 |
| 8,953,590 B1 | 2/2015 | Aggarwal | 370/389 |
| 9,036,474 B2 | 5/2015 | Dibirdi et al. | 370/235 |
| 9,049,233 B2 | 6/2015 | Frost et al. | |
| 9,065,766 B2 | 6/2015 | Matsuoka | |
| 9,094,337 B2 | 7/2015 | Bragg | |
| 9,112,734 B2 | 8/2015 | Edwards et al. | |
| 9,118,572 B2 | 8/2015 | Sajassi | |
| 9,319,312 B2 | 4/2016 | Filsfils et al. | 709/223 |
| 9,455,918 B1 | 9/2016 | Revah | 370/429 |
| 9,571,349 B2 | 2/2017 | Previdi et al. | |
| 9,660,897 B1 | 5/2017 | Gredler | |
| 9,749,227 B2 | 8/2017 | Frost et al. | |
| 2001/0037401 A1 | 11/2001 | Soumiya | 709/232 |
| 2001/0055311 A1 | 12/2001 | Trachewsky | 370/445 |
| 2002/0103732 A1 | 8/2002 | Bundy et al. | 705/35 |
| 2002/0126661 A1 | 9/2002 | Ngai | 370/380 |
| 2002/0191628 A1 | 12/2002 | Liu | 370/428 |
| 2003/0016678 A1 | 1/2003 | Maeno | 370/400 |
| 2003/0026271 A1 | 2/2003 | Erb et al. | 370/401 |
| 2003/0043802 A1 | 3/2003 | Yazaki | 370/389 |
| 2003/0048779 A1 | 3/2003 | Doherty | 370/389 |
| 2003/0088696 A1 | 5/2003 | McCanne | 709/238 |
| 2003/0126272 A1 | 7/2003 | Corl et al. | 709/230 |
| 2003/0133412 A1 | 7/2003 | Iyer | 370/235 |
| 2003/0142674 A1 | 7/2003 | Casey | 370/393 |
| 2003/0142685 A1 | 7/2003 | Bare | 370/410 |
| 2003/0210695 A1 | 11/2003 | Henrion | 370/392 |
| 2003/0231634 A1 | 12/2003 | Henderson | 370/395.3 |
| 2004/0160958 A1 | 8/2004 | Oh | 370/395.1 |
| 2004/0174879 A1 | 9/2004 | Basso et al. | 370/392 |
| 2004/0190526 A1 | 9/2004 | Kumar | |
| 2004/0190527 A1 | 9/2004 | Okura | 370/395.21 |
| 2004/0196840 A1 | 10/2004 | Amrutur et al. | 370/389 |
| 2004/0202158 A1 | 10/2004 | Takeno | 379/389 |
| 2004/0240442 A1* | 12/2004 | Grimminger | H04L 45/00 370/389 |
| 2004/0264374 A1 | 12/2004 | Yu | 370/230 |
| 2005/0018693 A1 | 1/2005 | Dull | |
| 2005/0073958 A1 | 4/2005 | Atlas | 370/238 |
| 2005/0105515 A1 | 5/2005 | Reed | 370/360 |
| 2005/0157724 A1 | 7/2005 | Montuno | 370/392 |
| 2005/0169270 A1 | 8/2005 | Mutou | 370/390 |
| 2005/0181807 A1 | 8/2005 | Dowling | 455/456.1 |
| 2005/0213513 A1 | 9/2005 | Ngo | 370/254 |
| 2005/0232272 A1 | 10/2005 | Deng | 370/390 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |

(56) References Cited

U.S. PATENT DOCUMENTS

| | | | |
|---|---|---|---|
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0133298 A1 | 6/2006 | Ng | 370/254 |
| 2006/0146696 A1 | 7/2006 | Li | 370/218 |
| 2006/0182035 A1 | 8/2006 | Vasseur | 370/238 |
| 2006/0187817 A1* | 8/2006 | Charzinski | H04L 45/02 370/216 |
| 2006/0262735 A1 | 11/2006 | Guichard | 370/254 |
| 2006/0274716 A1 | 12/2006 | Oswal et al. | 370/349 |
| 2006/0280192 A1 | 12/2006 | Desanti | 370/409 |
| 2006/0291444 A1 | 12/2006 | Alvarez | 370/351 |
| 2007/0019647 A1 | 1/2007 | Roy et al. | 370/392 |
| 2007/0041345 A1 | 2/2007 | Yarvis | |
| 2007/0053342 A1 | 3/2007 | Sierecki | 370/351 |
| 2007/0058638 A1 | 3/2007 | Guichard et al. | 370/395.3 |
| 2007/0115968 A1 | 5/2007 | Brown | |
| 2007/0127474 A1 | 6/2007 | Mirtorabi et al. | 370/390 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0049610 A1 | 2/2008 | Linwong | 370/225 |
| 2008/0069125 A1 | 3/2008 | Reed | 370/410 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Goode | 370/235 |
| 2008/0159285 A1 | 7/2008 | De Heer | 370/390 |
| 2008/0165783 A1 | 7/2008 | Desanti | 370/392 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0194240 A1 | 8/2008 | Dowling | 455/414.3 |
| 2008/0212465 A1 | 9/2008 | Yan | 370/225 |
| 2008/0225864 A1 | 9/2008 | Aissaoui et al. | 370/401 |
| 2008/0240105 A1 | 10/2008 | Abdallah | 370/392 |
| 2008/0253367 A1 | 10/2008 | Ould-Brahim | 370/389 |
| 2008/0259820 A1 | 10/2008 | White et al. | 370/255 |
| 2008/0316916 A1 | 12/2008 | Tazzari | 370/216 |
| 2009/0003349 A1 | 1/2009 | Havemann | |
| 2009/0003364 A1 | 1/2009 | Fendick | |
| 2009/0041038 A1 | 2/2009 | Martini et al. | 370/401 |
| 2009/0049194 A1 | 2/2009 | Csaszar | 709/242 |
| 2009/0067348 A1 | 3/2009 | Vasseur | 370/256 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0185549 A1 | 7/2009 | Shon | 370/349 |
| 2009/0196289 A1 | 8/2009 | Shankar | 370/390 |
| 2009/0213735 A1 | 8/2009 | Check | 370/236 |
| 2009/0219817 A1 | 9/2009 | Carley | 370/235.1 |
| 2009/0225650 A1 | 9/2009 | Vasseur | 370/218 |
| 2009/0247157 A1 | 10/2009 | Yoon | 455/434 |
| 2009/0296710 A1 | 12/2009 | Agrawal | 370/392 |
| 2009/0310610 A1 | 12/2009 | Sandstrom | 370/394 |
| 2010/0046400 A1 | 2/2010 | Wu | |
| 2010/0046515 A1 | 2/2010 | Wong | 370/390 |
| 2010/0063983 A1 | 3/2010 | Groarke et al. | 707/803 |
| 2010/0088717 A1 | 4/2010 | Candelore et al. | 725/32 |
| 2010/0124225 A1 | 5/2010 | Fedyk | |
| 2010/0124231 A1 | 5/2010 | Kompella | 370/40 |
| 2010/0142548 A1 | 6/2010 | Sheth | 370/410 |
| 2010/0191911 A1 | 7/2010 | Heddes | 711/118 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.53 |
| 2010/0284309 A1 | 11/2010 | Allan et al. | 370/256 |
| 2010/0329153 A1 | 12/2010 | Xu | |
| 2011/0021193 A1 | 1/2011 | Hong | |
| 2011/0060844 A1 | 3/2011 | Allan et al. | 709/241 |
| 2011/0063986 A1 | 3/2011 | Denecheau | 370/248 |
| 2011/0090913 A1 | 4/2011 | Kim | 370/400 |
| 2011/0149973 A1 | 6/2011 | Esteve Rothenberg | 370/392 |
| 2011/0202761 A1 | 8/2011 | Sarela et al. | 716/163 |
| 2011/0228770 A1 | 9/2011 | Dholakia | 370/390 |
| 2011/0228780 A1 | 9/2011 | Ashwood-Smith | 370/392 |
| 2011/0238816 A1 | 9/2011 | Vohra | |
| 2011/0261722 A1 | 10/2011 | Awano | 370/254 |
| 2011/0268114 A1 | 11/2011 | Wijnands et al. | 370/389 |
| 2011/0274112 A1 | 11/2011 | Czaszar | 370/392 |
| 2011/0280123 A1 | 11/2011 | Wijnands et al. | 370/228 |
| 2011/0286452 A1 | 11/2011 | Balus | 370/390 |
| 2011/0299531 A1 | 12/2011 | Yu | 370/392 |
| 2012/0044944 A1 | 2/2012 | Kotha et al. | 370/401 |
| 2012/0063526 A1 | 3/2012 | Xiao | 375/259 |
| 2012/0069740 A1 | 3/2012 | Lu et al. | 370/238 |
| 2012/0069845 A1 | 3/2012 | Carney et al. | 370/392 |
| 2012/0075988 A1* | 3/2012 | Lu | H04L 45/02 370/218 |
| 2012/0082034 A1 | 4/2012 | Vasseur | 370/235 |
| 2012/0099591 A1 | 4/2012 | Kotha | 370/392 |
| 2012/0099861 A1 | 4/2012 | Zheng | 398/45 |
| 2012/0106560 A1 | 5/2012 | Gumaste | 370/401 |
| 2012/0120208 A1 | 5/2012 | Nandagopal et al. | 370/238 |
| 2012/0170461 A1 | 7/2012 | Long | 370/235 |
| 2012/0179796 A1 | 7/2012 | Nagaraj | 709/223 |
| 2012/0198064 A1 | 8/2012 | Boutros | |
| 2012/0213225 A1 | 8/2012 | Subramanian et al. | 370/392 |
| 2012/0218884 A1 | 8/2012 | Kini | 370/228 |
| 2012/0236857 A1 | 9/2012 | Manzella | 370/390 |
| 2012/0236860 A1 | 9/2012 | Kompella et al. | 370/392 |
| 2012/0243539 A1 | 9/2012 | Keesara | 370/392 |
| 2012/0287818 A1 | 11/2012 | Corti et al. | 370/254 |
| 2012/0307629 A1 | 12/2012 | Vasseur | 370/228 |
| 2013/0003728 A1 | 1/2013 | Kwong et al. | 370/389 |
| 2013/0034097 A1 | 2/2013 | Dharmapurikar | 370/390 |
| 2013/0051237 A1 | 2/2013 | Ong | 370/237 |
| 2013/0051376 A1 | 2/2013 | Hatashita | 370/338 |
| 2013/0077476 A1 | 3/2013 | Enyedi | 370/225 |
| 2013/0077624 A1 | 3/2013 | Keesara et al. | 370/390 |
| 2013/0077625 A1 | 3/2013 | Khera et al. | 370/390 |
| 2013/0077626 A1 | 3/2013 | Keesara et al. | 370/390 |
| 2013/0107725 A1 | 5/2013 | Jeng | |
| 2013/0114402 A1 | 5/2013 | Ould-Brahim | 370/225 |
| 2013/0114595 A1 | 5/2013 | Mack-Crane | 370/390 |
| 2013/0114619 A1 | 5/2013 | Wakumoto | 370/406 |
| 2013/0136117 A1 | 5/2013 | Schrum, Jr. | 370/338 |
| 2013/0136123 A1 | 5/2013 | Ge | 370/390 |
| 2013/0142052 A1 | 6/2013 | Burbidge | 370/242 |
| 2013/0170450 A1 | 7/2013 | Anchan | 370/329 |
| 2013/0188634 A1 | 7/2013 | Magee | 370/389 |
| 2013/0195001 A1 | 8/2013 | Liu | 370/312 |
| 2013/0201988 A1 | 8/2013 | Zhou | 370/390 |
| 2013/0219034 A1 | 8/2013 | Wang et al. | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0308948 A1 | 11/2013 | Swinkels | 398/66 |
| 2013/0322449 A1 | 12/2013 | Hwang | |
| 2013/0329728 A1 | 12/2013 | Ramesh | 370/390 |
| 2013/0336315 A1 | 12/2013 | Guichard | 370/389 |
| 2013/0343204 A1 | 12/2013 | Geib et al. | 370/248 |
| 2013/0343384 A1 | 12/2013 | Shepherd | 370/390 |
| 2014/0010074 A1* | 1/2014 | Ye | H04L 45/22 370/228 |
| 2014/0010223 A1 | 1/2014 | Wang | 370/338 |
| 2014/0025821 A1 | 1/2014 | Baphna et al. | |
| 2014/0043964 A1 | 2/2014 | Gabriel | 370/229 |
| 2014/0044036 A1 | 2/2014 | Kim | |
| 2014/0064081 A1 | 3/2014 | Morandin | |
| 2014/0098813 A1 | 4/2014 | Mishra | 370/390 |
| 2014/0119191 A1 | 5/2014 | Onoue | 370/236 |
| 2014/0126575 A1 | 5/2014 | Janneteau | |
| 2014/0160925 A1 | 6/2014 | Xu | 370/235 |
| 2014/0169370 A1 | 6/2014 | Filsfils et al. | 370/392 |
| 2014/0177638 A1 | 6/2014 | Bragg et al. | 370/395.3 |
| 2014/0189156 A1 | 7/2014 | Morris | 709/238 |
| 2014/0189174 A1 | 7/2014 | Ajanovic | 710/106 |
| 2014/0192677 A1 | 7/2014 | Chew | 370/254 |
| 2014/0241357 A1 | 8/2014 | Liu et al. | |
| 2014/0254596 A1 | 9/2014 | Filsfils et al. | 370/392 |
| 2014/0269266 A1 | 9/2014 | Filsfils et al. | 370/228 |

(56) References Cited

U.S. PATENT DOCUMENTS

| | | | |
|---|---|---|---|
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0362846 A1 | 12/2014 | Li | 370/338 |
| 2014/0369356 A1 | 12/2014 | Bryant | 370/392 |
| 2015/0003458 A1 | 1/2015 | Li | 370/392 |
| 2015/0009823 A1 | 1/2015 | Ganga | 370/235 |
| 2015/0016469 A1 | 1/2015 | Ganichev | 370/429 |
| 2015/0023328 A1 | 1/2015 | Thubert et al. | 370/336 |
| 2015/0030020 A1 | 1/2015 | Kini | 370/389 |
| 2015/0049760 A1 | 2/2015 | Xu | 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0081941 A1 | 3/2015 | Brown | 710/116 |
| 2015/0085635 A1 | 3/2015 | Wijnands et al. | 370/216 |
| 2015/0092546 A1 | 4/2015 | Baratam | 370/230 |
| 2015/0109902 A1 | 4/2015 | Kumar | 370/219 |
| 2015/0131658 A1 | 5/2015 | Wijnands et al. | 370/390 |
| 2015/0131659 A1 | 5/2015 | Wijnands et al. | 370/390 |
| 2015/0131660 A1 | 5/2015 | Shepherd et al. | 370/390 |
| 2015/0138961 A1 | 5/2015 | Wijnands et al. | 370/228 |
| 2015/0139228 A1 | 5/2015 | Wijnands et al. | 370/390 |
| 2015/0172190 A1 | 6/2015 | Song | |
| 2015/0181309 A1 | 6/2015 | Wijnands et al. | 725/109 |
| 2015/0249587 A1 | 9/2015 | Kozat | 370/222 |
| 2015/0256456 A1 | 9/2015 | Previdi et al. | 370/392 |
| 2015/0263940 A1 | 9/2015 | Kini | 370/236.2 |
| 2015/0319086 A1* | 11/2015 | Tripathi | H04W 12/06 370/254 |
| 2015/0326675 A1 | 11/2015 | Kini | 709/224 |
| 2015/0334006 A1* | 11/2015 | Shao | H04L 45/22 370/225 |
| 2015/0381406 A1 | 12/2015 | Francois | 370/218 |
| 2016/0006614 A1 | 1/2016 | Zhao | 370/254 |
| 2016/0021000 A1 | 1/2016 | Previdi et al. | 370/389 |
| 2016/0034209 A1 | 2/2016 | Nanduri | 711/114 |
| 2016/0034370 A1 | 2/2016 | Nanduri | 714/6.22 |
| 2016/0087890 A1 | 3/2016 | Przygienda | |
| 2016/0119159 A1 | 4/2016 | Zhao | 370/390 |
| 2016/0127139 A1 | 5/2016 | Tian | |
| 2016/0127142 A1* | 5/2016 | Tian | H04L 12/1886 370/390 |
| 2016/0134518 A1 | 5/2016 | Callon | |
| 2016/0134535 A1 | 5/2016 | Callon | |
| 2016/0142248 A1 | 5/2016 | Thubert et al. | 370/372 |
| 2016/0173366 A1 | 6/2016 | Saad | 370/218 |
| 2016/0182353 A1 | 6/2016 | Garcia-Luna-Aceves | 709/241 |
| 2016/0191372 A1* | 6/2016 | Zhang | H04L 45/16 370/390 |
| 2016/0205588 A1 | 7/2016 | Liu | 370/392 |
| 2016/0218961 A1 | 7/2016 | Lindem | 370/389 |
| 2016/0226725 A1 | 8/2016 | Iizuka | |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |
| 2016/0344616 A1 | 11/2016 | Roch | |
| 2016/0352654 A1 | 12/2016 | Filsfils et al. | 370/392 |
| 2017/0012880 A1 | 1/2017 | Yang | |
| 2017/0019330 A1 | 1/2017 | Filsfils et al. | 370/389 |
| 2017/0099232 A1 | 4/2017 | Shepherd | 370/390 |
| 2017/0104673 A1 | 4/2017 | Bashandy et al. | 370/392 |
| 2017/0111277 A1 | 4/2017 | Previdi et al. | 370/392 |
| 2017/0126416 A1 | 5/2017 | McCormick | |
| 2017/0142006 A1 | 5/2017 | Wijnands et al. | 370/390 |
| 2017/0302561 A1 | 10/2017 | Filsfils et al. | 370/389 |
| 2017/0302566 A1 | 10/2017 | Zhang | |
| 2017/0302571 A1 | 10/2017 | Frost et al. | 370/254 |
| 2017/0346718 A1 | 11/2017 | Psenak et al. | 370/235 |
| 2017/0346737 A1 | 11/2017 | Previdi et al. | 370/392 |
| 2017/0366453 A1 | 12/2017 | Previdi et al. | 370/392 |
| 2018/0077051 A1 | 3/2018 | Nainar | 370/228 |
| 2018/0083790 A1 | 3/2018 | Wijnands et al. | 370/390 |
| 2018/0083871 A1 | 3/2018 | Filsfils | 370/392 |
| 2018/0091473 A1 | 3/2018 | Wijnands et al. | 370/390 |
| 2018/0131532 A1 | 5/2018 | Wijnands et al. | 370/312 |
| 2018/0205565 A1 | 7/2018 | Wijnands et al. | |
| 2018/0205636 A1 | 7/2018 | Hu | |
| 2018/0278470 A1 | 9/2018 | Wijnands et al. | 370/390 |
| 2018/0287934 A1 | 10/2018 | Wang | 370/389 |
| 2018/0287935 A1 | 10/2018 | Wang | 370/389 |
| 2018/0309664 A1 | 10/2018 | Balasubramanian | |
| 2018/0316520 A1 | 11/2018 | Wijnands et al. | 370/392 |
| 2019/0014034 A1 | 1/2019 | Allan | |
| 2019/0075041 A1 | 3/2019 | Wang | |
| 2019/0116114 A1 | 4/2019 | Chen | |

FOREIGN PATENT DOCUMENTS

| | | | |
|---|---|---|---|
| CN | 1792 065 | 6/2006 | H04L 12/56 |
| CN | 101247 253 A | 8/2008 | H04L 12/18 |
| CN | 101242413 | 8/2008 | H04L 29/06 |
| CN | 101385 275 | 3/2009 | H04L 12/18 |
| CN | 101399 688 A | 4/2009 | H04L 12/18 |
| CN | 101496 357 A | 7/2009 | H04L 12/56 |
| CN | 101572 667 | 11/2009 | H04L 12/56 |
| CN | 101616 466 A | 12/2009 | H04W 40/02 |
| CN | 101689 172 | 3/2010 | G06F 15/173 |
| CN | 101803 293 A | 8/2010 | H04L 12/28 |
| CN | 101841 442 A | 9/2010 | H04L 12/56 |
| CN | 101931 548 A | 12/2010 | H04L 12/24 |
| CN | 102025 538 | 4/2011 | H04L 12/56 |
| CN | 102098 222 A | 6/2011 | H04L 12/56 |
| CN | 102132 533 A | 7/2011 | H04L 12/56 |
| CN | 102299 852 A | 12/2011 | H04L 12/56 |
| CN | 102498 694 A | 6/2012 | H04L 12/56 |
| CN | 102577 238 | 7/2012 | H04L 12/18 |
| CN | 102714 625 A | 10/2012 | H04L 12/56 |
| WO | WO 2007/095331 | 8/2007 | 370/390 |
| WO | WO 2008/021195 A1 | 2/2008 | |

OTHER PUBLICATIONS

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.;"Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Das, Kaushik, "IPv6 Header Deconstructed"; http://www.ipv6.com/articles/general/IPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

(56) References Cited

OTHER PUBLICATIONS

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Gharai, L. et al., "RTP Payload Format for Society of Motion Picture and Television Engineers (SMPTE) 292M Video," Network Working Group, Request for Comments 3497, Mar. 2003, pp. 1-12.
Hinden, R., Nokia and S. Deering, Cisco Systems, Inc.;"IP Version 6 Addressing Architecture," Network Working Group, Request for Comments 4291, Feb. 2006, pp. 1-25.
Kompella, K. et al., "The Use of Entropy Labels in MPLS Forwarding," Internet Engineering Task Force (IETF), Request for Comments 6790, Nov. 2012, pp. 1-25.
Kumar, N. et al., Cisco Systems, Inc., "OSPF Extension for Bit Index Explicit Replication, draft-kumar-ospf-bier-extension-00," Internet-Draft, May 19, 2014, pp. 1-7.
Kumar, N., et al., "BIER Use Cases, draft-kumar-bier-use-cases-00," Network Working Group, Internet-Draft, Oct. 25, 2014, pp. 1-7.
Laabs, Matthias, "SDI over IP—Seamless Signal Switching in SMPTE 2022-6 and a Novel Multicast Routing Concept," EBU Technical Review, 2012 Q4, pp. 1-7.
Li, Tony et al., "IGP Requirements for Traffic Engineering With MPLS, draft-li-mpls-igp-te-00.txt," Network Working Group, Internet-Draft, Feb. 1999, pp. 1-6.
Microsoft, "IPv6 Addressing (TechRef)"; Apr. 3, 2011; https://technet.microsoft.com/en-us/library/dd392266(v=ws.10).aspx; pp. 1-30.
Moy, J., Ascend Communications, Inc., "OSPF Version 2," Network Working Group, Request for Comments 2328, Apr. 1998, pp. 1-244.
Przygienda, T. et al., "M-ISIS: Topology (MT) Routing in Intermediate System to Intermediate Systems (IS-ISs)," Network Working Group, Request for Comments 5120, Feb. 2008, pp. 1-14.
Psenak, P. et al., "Multi-Topology (MT) Routing in OSPF," Network Working Group, Request for Comments 4915, Jun. 2007, pp. 1-20.
Psenak, P. et al., Cisco Systems; "OSPF Extensions for BIER, draft-psenak-ospf-bier-extensions-00," OSPF, Internet-Draft, Sep. 27, 2014, pp. 1-6.
Psenak, P. et al., Cisco Systems; "OSPF Extensions for BIER, draft-psenak-ospf-bier-extensions-01," OSPF, Internet-Draft, Oct. 24, 2014, pp. 1-8.
Psenak, P. et al., "OSPF Extensions for Segment Routing, draft-psenak-ospf-segment-routing-extension-05," Open Shortest Path First IGP, Internet-Draft, Jun. 2014, pp. 1-33.
Rekhter, Ed. Y. et al., "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-13vpn-mvpn-bier-01," Internet Engineering Task Force, Internet-Draft, Oct. 16, 2014, pp. 1-9.
Schulzrinne, H. et al.,; "RTP: A Transport Protocol for Real-Time Applications," Network Working Group, Request for Comments 3550, Jul. 2003, pp. 1-89.
Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.
Shen, N. et al., "Calculating Interior Gateway Protocol (IGP) Routes Over Traffic Engineering Tunnels," Network Working Group, Request for Comments 3906, Oct. 2004, pp. 1-8.
SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.

SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Xu, X. et al., "BIER Encapsulation, draft-xu-bier-encapsulation-00," Network Working Group, Internet-Draft, Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].
Psenak, Peter et al., "Enforcing Strict Shortest Path Forwarding Using Strict Segment Identifier"; U.S. Appl. No. 16/384,219, filed Apr. 15, 2019; consisting of Specification, Claims, Abstract, and Drawings (48 pages).
Eckert, Toerless et al., "Traffic Engineering for Bit Indexed Explicit Replication"; U.S. Appl. No. 16/457,339, filed Jun. 28, 2019; consisting of Specification, Claims, Abstract, and Drawings (88 pages).
Previdi, Stefano et al., "Segment Routing Extension Headers"; U.S. Appl. No. 16/525,000, filed Jul. 29, 2019; consisting of Specification, Claims, Abstract, and Drawings (57 pages).
Rosen, E. et al., Cisco Systems, Inc., "Multiprotocol Label Switching Architecture", Network Working Group, Request for Comments: 3031; Jan. 2001, pp. 1-61.
Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.
Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.
Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.
Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.
Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.
Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.
Akiya, N., "Segment Routing Implications on BFD"; Sep. 9, 2013; 3 pages.

(56) References Cited

OTHER PUBLICATIONS

Alcatel-Lucent, "Segment Routing and Path Computation Element—Using Traffic Engineering to Optimize Path Placement and Efficiency in IP/MPLS Networks"; Technology White Paper; 2015; 28 pages.
Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.
Awduche, Daniel O., et al., "RSVP-TE: Extensions to RSVP for LSP Tunnels," Network Working Group, Internet-Draft, Aug. 2000, pp. 1-12.
Awduche, Daniel O., et al., "RSVP-TE: Extensions to RSVP for LSP Tunnels," Network Working Group, Request for Comments 3209, Dec. 2001, pp. 1-61.
Awduche, D. et al., "Requirements for Traffic Engineering Over MPLS"; Network Working Group; Request for Comments: 2702; Sep. 1999; pp. 1-29.
Awduche, D. et al., "Overview and Principles of Internet Traffic Engineering"; Network Working Group; Request for Comments: 3272; May 2002; pp. 1-71.
Backes, P. and Rudiger Geib, "Deutsche Telekom AG's Statement About IPR Related to Draft-Geig-Spring-OAM-Usecase-01," Feb. 5, 2014, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Cisco Systems, Inc., "Introduction to Intermediate System-to-Intermediate System Protocol," published 1992-2002; pp. 1-25.
Crabbe, E., et al., "PCEP Extensions for MPLS-TE LSP Protection With Stateful PCE Draft-Crabbe-PCE-Stateful-PCE-Protection-00," Network Working Group, Internet-Draft, Oct. 2012, pp. 1-12.
Crabbe, E., et al., Stateful PCE Extensions for MPLS-TE LSPs, draft-crabbe-pce-stateful-pce-mpls-te-00; Network Working Group, Internet-Draft, Oct. 15, 2012, pp. 1-15.
Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol-Traffic Enginering (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013; pp. 1-28.
Filsfils, C., et al., Cisco Sytems, Inc., "Segment Routing Architecture"; draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP"; draft-filsfils-spring-segment-routing-ldp-interop-01.txt; Apr. 18, 2014, pp. 1-16.
Filsfils, C. et al., "Segment Routing Architecture"; draft-ietf-spring-segment-routing-07; Network Working Group, Internet-Draft; Dec. 15, 2015; pp. 1-24.
Filsfils, C. et al.; "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing Use Cases", draft-filsfils-rtgwg-segment-routing-use-cases-02; Network Working Group; Internet-Draft; Oct. 21, 2013; pp. 1-36.
Filsfils, C. et al., "Segment Routing with MPLS Data Plane", draft-ietf-spring-segment-routing-mpls-05; Network Working Group; Internet-Draft; Jul. 6, 2016; 15 pages.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Berlin, Jul./Aug. 2013, pp. 1-3.
Geib, R., Deutsch Telekom, "Use Case for a Scalable and Topology Aware MPLS data plan monitoring System," draft-geib-spring-oam-usecase-00; Internet-Draft, Oct. 17, 2013, pp. 1-7.
Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packet Switched Networks," pp. 196-201.
Kompella, K. et al, Juniper Networks, "Label Switched Paths (LSP) Hierarchy with Generalized Multi-Protocol Label Switching (GMPLS) Traffic Enginering (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplan;," draft-kumarkini-mpls-spring-lsp-ping-00; Network Work Group; Internet-Draft; Jan. 2, 2014, pp. 1-15.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.
Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.

(56) References Cited

OTHER PUBLICATIONS

Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.
Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.
Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.
Raszuk, R., NTT 13, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Li, T., et al., Redback Networks, Inc., "IS-IS Extensions for Traffic Engineering," Network Working Group, Request for Comments 5305, Oct. 2008, 17 pages.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Vasseur, JP, et al.; Cisco Systems, Inc. Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Bashandy, Ahmed R. et al., "Segment Routing Over Label Distribution Protocol", U.S. Appl. No. 16/367,869, filed Mar. 28, 2019; consisting of Specification, Claims, Abstract, and Drawings (37 pages).
Wijnands, Isjbrand et al., "Bit Indexed Explicit Forwarding Optimization"; U.S. Appl. No. 16/525,649, filed Jul. 30, 2019; consisting of Specification, Claims, Abstract, and Drawings (49 pages).
Wang, Xiaorong et al., "Multicast Traffic Steering Using Tree Identity in Bit Indexed Explicit Replication (BIER)"; U.S. Appl. No. 16/557,065, filed Aug. 30, 2019; consisting of Specification, Claims, Abstract, and Drawings (96 pages).
Previdi, Stefano et al.; "Segment Routing: PCE Driven Dynamic Setup of Forwarding Adjacencies and Explicit Path"; U.S. Appl. No. 15/394,169, filed Oct. 11, 2019; consisting of Specification, Claims, Abstract, and Drawings (31 pages).
Wijnands, Isjbrand et al., "Overlay Signaling for Bit Indexed Explicit Replication"; U.S. Appl. No. 16/654,078, filed Oct. 16, 2019; consisting of Specification, Claims, Abstract, and Drawings (53 pages).
Wijnands, Ijsbrand et al., "Bit Indexed Explicit Replication"; U.S. Appl. No. 16/669,653, filed Oct. 31, 2019; consisting of Specification, Claims, Abstract, and Drawings (49 pages).

* cited by examiner

FAILURE PROTECTION FOR TRAFFIC-ENGINEERED BIT INDEXED EXPLICIT REPLICATION

RELATED APPLICATIONS

The present patent application is a continuation of U.S. patent application Ser. No. 15/054,480 filed on Feb. 26, 2016, entitled "Failure Protection for Traffic-Engineered Bit Indexed Explicit Replication," now U.S. Pat. No. 10,122,614 issued on Nov. 6, 2018, which claims the domestic benefit, under Title 35, Section 119(e) of the United States Code, of U.S. Provisional Patent Application Ser. No. 62/121,291, entitled "Traffic Engineering for Bit Indexed Explicit Replication" and filed Feb. 26, 2015. Both are hereby incorporated by reference in entirety and for all purposes as if completely and fully set forth herein.

BACKGROUND

Network nodes forward data. Network nodes may take form in one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Forwarding messages involves various processes that, while simple in concept, can be complex. The processes involved in forwarding vary, depending on the type of forwarding method used. Overall forwarding configurations include unicast, broadcast, and multicast forwarding. Unicast is a method of point-to-point communication most often used when a particular node (known as a source) wishes to send data to another particular node (known as a receiver) and is not concerned with sending the data to multiple receivers. Broadcast is method used when a source wishes to send data to all receivers in a domain, and multicast allows a source to send data to a group of receivers in a domain while preventing the data from being sent to other receivers in the domain.

Multicast is the preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1:
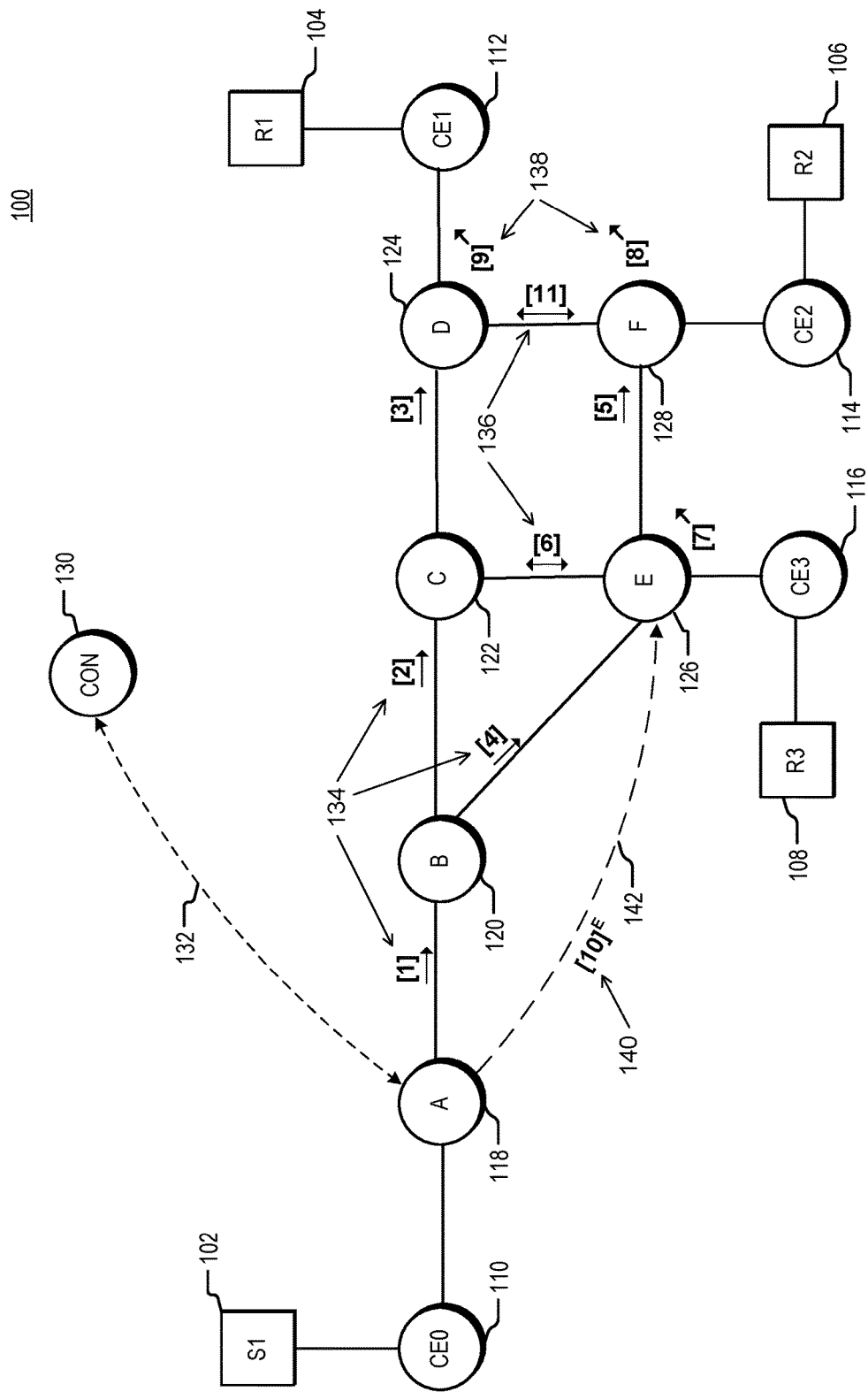
FIG. 1 is a simplified diagram illustrating certain components of an example network.

Methods and network devices are disclosed for failure protection during forwarding using traffic-engineered bit-indexed explicit replication (BIER-TE). The failure protection includes an intrinsic fast reroute (FRR) mechanism. In one embodiment, a method includes determining a protected link or node in a network, where the protected link or node is included in a designated path to be taken by a message through the network to a destination node, the designated path is encoded in a message bit array carried by the message, and assigned bit positions in the message bit array represent respective network links along the designated path. In this embodiment, the method further includes determining a backup path to the destination node from a feeder node adapted to forward a message carrying the message bit array into the protected link or node, and populating an entry in a path update table stored at the feeder node.

Multicast

Multicast transmission delivers multicast packets (packets that traditionally include information identifying a multicast group, such as a multicast group address) from a source to multiple receivers without unduly burdening the source. Although some of the discussion in this disclosure is in terms of packets, it should be understood that the disclosures made herein may also be applicable to other types of network messages, such as datagrams or data frames. As used herein, the term "receiver" signifies a host (such as a computing device or application) that has subscribed to a multicast group. Instead of the source replicating a multicast packet and sending a copy of the multicast packet to each receiver, the source sends a single copy of a multicast packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast packet close to the destination of that multicast packet, obviating the use of multiple unicast connections for the same purpose. This saves network bandwidth and improves throughput.

Typical multicast routing protocols require that each node's multicast forwarding table include, for example, information mapping source and group identifiers for each multicast flow to the interfaces over which the node must forward a packet replica for that group, and the interface over which a packet for that group should properly arrive. The multicast forwarding tables maintained by each multicast-enabled node can become quite large in networks with many multicast sources, many multicast groups, or both. Maintaining such multicast forwarding tables imposes limitations on network scalability.

Bit Indexed Explicit Replication (BIER)

In a "stateless multicast" technique known as Bit Indexed Explicit Replication (BIER), the amount of state information within a multicast network is reduced. In BIER forwarding, receiver information is encoded in the packet rather than looked up in tables at each node based on multicast source and group information. Specifically, the receiver information is encoded in a bit array carried by the packet. BIER forwarding is described in more detail in, for example, co-pending U.S. application Ser. No. 14/604,092, but generally speaking each node associated with a multicast receiver is assigned a bit position in the bit array. A node connected to a receiver may also be referred to as a "receiver node" or a "destination node" herein. The value of the bit at a given bit position indicates whether the receiver node corresponding to that bit position is an intended receiver, or destination, for the multicast packet carrying the bit array.

In forwarding a BIER multicast packet containing a packet bit array (or, more generally, a BIER multicast message containing a message bit array), a BIER-enabled node determines whether any intended destination nodes for the packet are also reachable nodes from the BIER-enabled node. This is done using a bit-indexed forwarding table stored at the BIER-enabled node, the forwarding table having an entry for each of the BIER-enabled node's neighbor (directly connected next-hop) nodes. In an embodiment, the entry for each neighbor node includes a neighbor bit array with the same mapping of bit positions to destination nodes as that of the packet bit array. In a neighbor bit array, however, the value of the bit at a given bit position indicates whether the corresponding receiver node is reachable from the neighboring node associated with the forwarding table entry containing the neighbor bit array. Whether a node is "reachable," for purposes of BIER forwarding, from a neighboring node depends on whether the neighboring node is included in the shortest path to the destination node, as determined through an interior gateway protocol (IGP) used in the network. A message bit array may also be called a "bit string" herein, and a neighbor bit array may be called a "bit mask."

If comparison of the packet bit array of an incoming BIER packet with a neighbor bit array in a forwarding table entry shows that at least one intended destination node for the multicast packet is reachable via a neighbor node, a replica of the multicast packet is forwarded to the neighbor node, using routing information from the forwarding node's unicast routing table. This process is repeated for forwarding table entries associated with any other neighbor nodes, and each forwarded replica packet is in turn handled in a similar manner when received by the respective BIER-enabled neighbor node. In this manner the multicast packet is replicated and forwarded as needed to reach the intended destinations. In some embodiments, modifications are made to a packet bit array during the forwarding process, either as a packet bit array is compared to neighbor bit arrays in successive forwarding table entries at the node, or before a replica packet carrying a packet bit array is forwarded to a neighbor node, or in both situations. Such modifications can prevent looping and replication of packets.

Traffic Engineering

The BIER forwarding mechanism referenced above depends on the use of a forwarding node's unicast routing information. The BIER packet bit array tells a BIER-enabled node which destinations the packet must reach, but not the path to use to get them there. The path used for forwarding a given replica packet is the path determined by the forwarding node's unicast routing table, which is typically built using a shortest-path-first algorithm. There is no mechanism for routing a packet along an explicit path (also called "traffic engineering") using BIER as typically implemented.

There are situations in which explicit routing of multicast packets is desirable. For example, explicit paths are often used in Operations, Administration and Maintenance (OAM) activities designed to monitor or measure network path variables such as packet loss or transmission delay. Another application in which explicit routing can be useful is that of professional media networks using Internet Protocol (IP) for video broadcasting. Video broadcasting networks typically involve capture of content in multiple locations, processing of the content, and transmission of content (known as contribution) to one or more other locations. Content from various sources can be merged into a continuous stream and provided to potentially numerous receivers, based on control signals generated by a controller. Switching between content sources and modifying the selection of receivers that receive the stream is extremely time-critical. If these transitions do not occur on very specific boundaries or time intervals, video and audio distortions or discontinuities can result. Video transmission is also very sensitive to errors caused by the packet loss that may occur in IP networks. As such, some error correction schemes involve sending matching packet streams over alternate paths so that a receiver can switch between the streams to reconstruct an error-free signal. The stringent timing requirements involved in video broadcasting generally, along with the requirement for multiple independent paths in certain situations, makes an ability to define explicit paths desirable.

Certain existing technologies allow for traffic engineering. In a network employing Multiprotocol Label Switching (MPLS), for example, an explicit path can be established using a protocol called Resource Reservation Protocol with Traffic Engineering (RSVP-TE). An explicit path, or "tunnel" is specified using RSVP-TE when the initial node sends a request message from node to node along the length of the requested path, and the final node of the path confirms by sending back along the path the MPLS labels to be used for the path. These labels must then be added to the forwarding tables of the nodes along the path. The reservation process must be done again if the explicit path is altered in response to a change in network topology or conditions. The RSVP-TE process can be extended to multicast trees using point-to-multipoint (P2MP) RSVP-TE. Each multicast group will have its own tree reservation process and its own set of labels, requiring significant state at each node for forwarding tables relating labels to group and source information, in addition to the time and bandwidth required for the reservation process.

Another forwarding mechanism allowing creation of explicit paths is segment routing. Segment routing is described in detail in, for example, co-pending U.S. patent application Ser. No. 14/292,264. In segment routing, path information is carried with the packet in the form of a set of segment identifiers, where the path is constructed from topological sub-paths with each sub-path associated with a segment identifier. The set of segment identifiers carried by the packet can be implemented in various data plane technologies, such as through a stack of MPLS labels, or through a string of identifiers embedded in an Internet Protocol version 6 (IPv6) extension header. Segment identifiers can be advertised and exchanged using the existing IGP used for exchanging unicast routing information in the IP network, so that a control plane protocol such as the Label Distribution Protocol (LDP) or RSVP-TE protocols used in MPLS networks is not needed. A set of segment identifiers defining the path for a packet is determined by, for example, an ingress node or a network controller and added to the encapsulation of the packet. The encapsulation arranges the segment identifiers in sequential order along the defined path. Forwarding then proceeds by lookup, in a segment routing forwarding table of the forwarding node, of the first segment identifier (e.g., the uppermost identifier, in an MPLS implementation using a label stack). When the sub-path corresponding to a segment identifier has been traversed, that identifier is removed from the active set of segment identifiers carried by the packet. The path for the packet is accordingly defined by accessing the segment identifiers carried by the packet in sequential order. Although segment routing allows an explicit path to be defined with relatively minimal "state" (storage of identifiers, labels, etc.) at each forwarding node, segment routing as currently defined does not allow for multicast path definition or forwarding.

Bit Indexed Explicit Replication with Traffic Engineering (BIER-TE)

A new forwarding method called Bit Indexed Explicit Replication with Traffic Engineering (BIER-TE) allows multicast explicit paths to be defined while exhibiting a similar reduction of multicast state information to that provided by the existing BIER forwarding mechanism described above. The existing BIER mechanism may be referred to as "BIER", BIER-shortest path first ("BIER-SPF") or "non-TE BIER" herein. Both BIER and BIER-TE encode path-related information in a bit array carried by the packet. However, the type of information encoded is different for the two techniques. As described above, bit positions in the bit array used in BIER correspond to receivers of a multicast packet (such as egress nodes connected to respective receivers, or egress interfaces of such egress nodes). In BIER-TE, by contrast, bit positions correspond to links within a path, where "link" is used in a general sense herein as a data connection between a network node and another node or another protocol level of the network. Links as described herein function as path segments, or sub-paths, such that the path for a message is formed from a series of connected links. Links represented by bit positions may also be referred to as "hops" or "adjacencies" herein.

A link represented by a bit position in a BIER-TE bit array can be of multiple different types. For example, a link can connect one network node and a directly-connected adjacent node. This type of direct link can be defined as either a one-way or two-way link. A bit position may also represent an indirect connection between one node and a non-adjacent node, such that the link includes one or more intervening nodes. In addition to these direct and indirect connections between network nodes, a bit position may represent a connection between the BIER-TE protocol layer and a higher protocol layer of the network.

Preparation for forwarding of a packet by BIER-TE includes four basic processes: the path (or set of paths forming a multicast tree) for the packet (and other packets in the same multicast group) is determined; bit positions are assigned to the links that join together to create the path or tree; the packet is encapsulated to include a packet bit array having set bits in the bit positions corresponding to the links along the path; and for each node along the path, bit positions representing links connected to that node are added to a BIER-TE forwarding table at the node, along with appropriate forwarding instructions.

BIER-TE Forwarding Example

FIG. 1 shows an example network 100. Network 100 includes nodes 118, 120, 122, 124, 126 and 128, which are configured to forward packets or other messages using BIER-TE. For example, these BIER-TE-enabled nodes are configured to store and use respective bit-indexed forwarding tables based on BIER-TE bit position assignments, as explained further below. In some embodiments, some or all of these BIER-TE-enabled nodes are also enabled to forward non-TE BIER packets, using different forwarding tables reflecting different bit position assignments. Letters A through F denote respective unique identifiers for the BIER-TE-enabled nodes, such as IP loopback addresses (in the case of an IP network). For brevity, these letters are used herein to reference the respective nodes and for describing links and paths in network 100. The solid lines between the nodes represent data connections between them; in an embodiment, the connections are physical point-to-point links.

Figure 2:
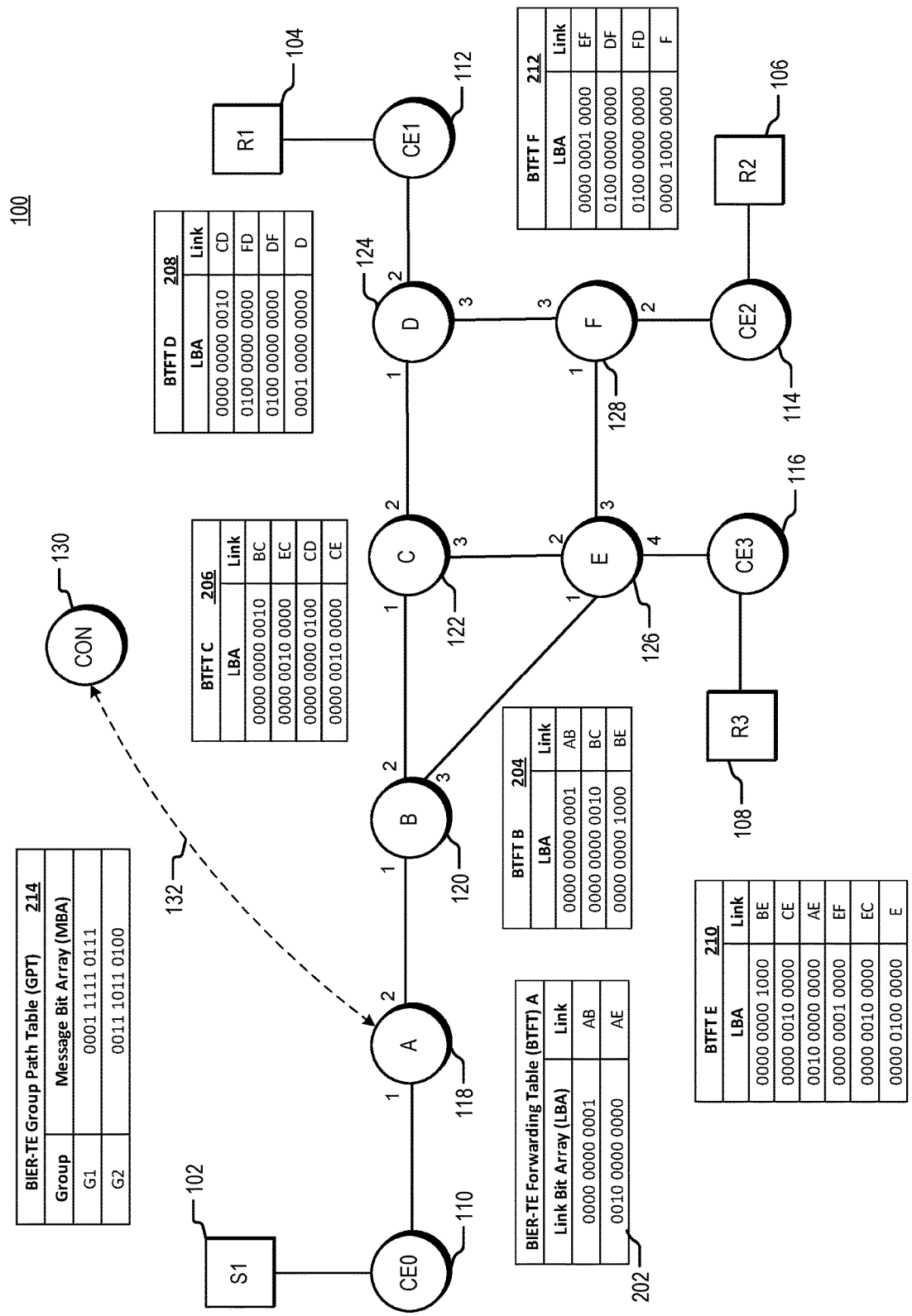
FIG. 2 is a simplified diagram illustrating certain components of an example network.

In the embodiment of FIG. 1, BIER-TE-enabled nodes 118, 120, 122, 124, 126 and 128 form a provider network, or domain. Such a provider network could be employed by an Internet service provider to transport packets to customers. The domain includes core nodes 120 and 122, and provider edge nodes 118, 124, 126, and 128. The provider edge nodes are coupled to customer edge nodes 110, 112, 114, and 116. Hosts 102, 104, 106, and 108 are coupled to the customer edge nodes. In the embodiment of FIG. 2, host 102 is a multicast source, while hosts 104, 106, and 108 are configured as multicast receivers, or subscribers. BIER-TE-enabled node 118 is configured as an ingress router for multicast data packets. The ingress router is coupled, via customer edge node 110, to source 102. Multicast data packets from source 102 enter the BIER-TE network via ingress router 118. Each of BIER-TE-enabled nodes 124, 126, and 128 is configured as an egress router. The egress routers can be connected (directly or via customer edge routers) to hosts, such as receivers, or other networks. An egress router as used herein is a BIER-TE-enabled node that is the last BIER-TE-enabled node on a path between a source and a receiver. The egress router may be a provider edge node that is coupled to the receiver either directly or indirectly (e.g., through a non-BIER-enabled customer edge node).

Network 100 also includes a central controller 130. In an embodiment, controller 130 is a controller host external to the data path of the BIER-TE network. In an alternative embodiment, ingress node 118 is configured to perform some or all of the functions of controller 130. In yet another embodiment, some or all of the functions of controller 130 may be performed through manual configuration procedures. In an embodiment, controller 130 of FIG. 1 interacts with each of the BIER-TE-enabled nodes through a mechanism and/or protocol different than those used to forward multicast packets through network 100. This interaction may be referred to as "out-of-band" or "overlay" signaling. An exemplary interaction between controller 130 and ingress node A is illustrated by dashed line 132 in FIG. 1. Although additional dashed lines are omitted from FIG. 1 for clarity, similar communications occur between controller 130 and each of nodes B through F. Communication between controller 130 and the BIER-TE-enabled nodes may occur through one or more control protocols. As an example, communications with controller 130 may occur using the NETCONF and/or RESTCONF protocols and the YANG data modeling language. These protocols are described further in, for example, "Network Configuration Protocol (NETCONF)," by R. Enns, M. Bjorklund, J. Schoenwaelder, and A. Bierman, Eds., RFC 6241, June 2011, available at https://tools.ietf.org/html/rfc6241, "RESTCONF Protocol," by A. Bierman, M. Bjorklund, and K. Watsen, Jun. 4, 2015, available at https://tools.ietf.org/html/draft-ietf-netconf-restconf-05, and "YANG—A Data Modeling Language for the Network Configuration Protocol (NETCONF)," by M. Bjorklund, Ed., RFC 6020, October 2010, available at https://tools.ietf.org/html/rfc6020, which documents are incorporated by reference as if fully set forth herein. As another example, controller 130 may communicate with nodes A through F using a border gateway protocol (BGP), in an embodiment in which the BIER-TE-enabled nodes are running a BGP. Communications with controller 130 are carried over data links to controller 130 that are not explicitly shown in FIG. 1. In an embodiment, control communications between nodes A through F and controller 130 are carried over some or all of the same physical links used for transmission of messages through network 100, although different protocols are used for the message transmission and the control communications.

The functions of controller 130 in the embodiment of FIG. 1 include: assigning bit positions to links within the BIER-TE-enabled portion of network 100; communicating the bit position assignments to forwarding tables in the respective BIER-TE-enabled nodes; determining the explicit path (or tree) to be followed by messages within a particular multicast group; and communicating to the BIER-TE ingress node for the group the bit positions making up the path, along with an identification of the multicast group. Embodiments employing a controller such as controller 130 may be associated with software-defined networking (SDN) implementations. In assigning bit positions, the controller uses topological information for the network. In an embodiment, the network nodes are running an interior gateway protocol (IGP), and controller 130 obtains the topology of network 100 through IGP advertisements. In an alternative embodiment, controller 130 obtains topology information through operation of a different protocol, or through manual configuration. Controller 130 typically also uses multicast group membership information in assigning bit positions. Bit position assignments are needed only for network links that are included in a path taken by messages in the network, not necessarily for every link in the network. Multicast group membership information can therefore assist controller 130 in determining which network links should be assigned bit positions and included in explicit paths. In an embodiment, provider edge nodes such as nodes A, D, E and F of network 100 communicate with controller 130 to identify their respective hosts as either a source of or a receiver of (subscriber to) a particular multicast transmission, and inform the controller of any changes in group membership status. In a further embodiment, communication by a provider edge node with controller 130 is in response to receiving a multicast protocol message (such as a "join" or "prune" message) from the node's associated host.

An exemplary assignment of bit positions to links is illustrated in FIG. 1. In the notation used in FIG. 1, a bit position assigned to a link is denoted by a numeral in brackets. Other aspects of the notation represent different types of links, as explained further below. For example, bit position assignments 134 include a bit position number in brackets positioned above a one-way arrow. The arrow is oriented to point in the direction of the link represented by the bit position. For example, bit position 1 is assigned to the direct link between node A and node B, for a message traveling from A to B. In other words, bit position 1 represents a one-way direct link between nodes A and B. Such a direct link may also be called, for example, a "direct adjacency," a "connected adjacency," a "forward-connected adjacency" or a "direct-hop" link or adjacency. Similarly, bit position 2 is assigned to a one-way direct link between nodes B and C, and bit position 4 to a one-way direct link between nodes B and E. Other one-way direct links between BIER-TE-enabled nodes in network 100 include those between nodes C and D (assigned bit position 3) and between nodes E and F (assigned bit position 5).

In the convention used herein, assignment of a bit position number to a link means that a bit array encoding a path containing that link will have a set bit (a bit value of "1" rather than "0") in the bit position corresponding to the link's bit position number, counting from the right. For example, a 12-bit bit array encoding only the path between nodes B and C in FIG. 1 (assigned bit position 2) is denoted {0000 0000 0010}, where bits in the bit array are arranged in groups of four for readability. Other conventions may be used in embodiments of the methods and systems described herein, however. For example, the use of a bit value of "1" in the position of a link included in the path and "0" otherwise could be reversed, or the bit positions could be counted from the leftmost bit of the bit array in some embodiments. As another example, although bit positions are numbered herein starting with "1", a numbering system beginning with "0" could be used in other embodiments.

Returning to FIG. 1, another type of link is represented by bit position assignments 136. Assignments 136 assign bit position 6 to a two-way direct link between nodes C and E, as indicated by the two-way arrow below the bit position numeral, and bit position 11 to a two-way direct link between nodes D and F. In other words, bit position 6 represents both the direct link from node C to node E and the link in the other direction, from node E to node C. Still another type of link is represented by bit position assignments 138 in FIG. 1. Bit position assignments 138 are for links associated with egress nodes such as nodes D and F. The diagonally-upward arrow used in the notation for assignments 138 indicates a link to a higher protocol layer in network 100. In particular, the assigned bit position is associated with decapsulation of the BIER-TE information from the message, and passing of the message to the next higher protocol layer, or the forwarding protocol used outside of the BIER-TE domain. As an example, the protocol that the message is passed to can be an MPLS multicast or IP multicast protocol. Any further replication or forwarding needed is then performed using the higher layer protocol. This type of link to a higher protocol may be called, for example, a "local link," "local adjacency," or "local decapsulation" adjacency or link. In the embodiment of FIG. 1, bit position 9 is associated with a link at node D to the next higher protocol layer in network 100, bit position 8 is associated with a link at node F to the next higher protocol layer, and bit position 7 is associated with a similar link at node E.

Bit position assignment 140 in FIG. 1 represents yet another type of network link. Assignment 140 assigns bit position 10 to a link between node A and node E, but the link is not a direct link, since the nodes are not directly connected in network 100. In the embodiment of FIG. 1, for example, a message can travel between nodes A and E by going through node B to node E or by going through node B and then node C, and even nodes D and F, to reach node E. For some messages forwarded by node A, it may be important that the message goes through node E, but it may not matter which path to node E the message takes. For such a message, controller 130 can construct an explicit path including an indirect link from node A to node E. This indirect link is illustrated in FIG. 1 by dashed line 142, and indicated in the notation of bit position assignment 140 by a superscript E denoting the destination node, with the absence of an arrow pointing along a particular route. This type of indirect link may also be called, for example, a "remote adjacency," a "forward-routed adjacency," or a "loose-hop" link or adjacency. In an embodiment, node A implements the message forwarding associated with bit position 10 by using unicast routing information stored at node A. Forwarding mechanisms associated with the bit position assignments discussed above are described further in connection with FIGS. 2 and 3 below.

The bit position assignments shown in FIG. 1 are used to describe the explicit path to be taken by a multicast message. For example, a path ABEF through the network is made up of links having bit positions 1, 4 and 5. A 12-bit bit array carried by a message assigned to path ABEF can be denoted {0000 0001 1001}. Path ABCD is made up of links having bit positions 1, 2 and 3, resulting in a bit array for the path denoted {0000 0000 0111}.

The bit position assignment notation of FIG. 1 is intended to aid in visualization of explicit path formation using links, or path segments, having assigned bit positions. Use of assigned bit positions in BIER-TE forwarding is implemented through forwarding table entries corresponding to those bit positions relevant to a given BIER-TE-enabled node, and through encapsulation of messages to carry a bit array encoding the explicit path to be traveled by the message. Exemplary message bit arrays and forwarding table entries are shown in FIG. 2. FIG. 2 illustrates network 100 as shown in FIG. 1, but with the bit position assignments reflected in exemplary forwarding table portions for each node. FIG. 2 also includes designations of interfaces of the BIER-TE enabled nodes. For example, node B has three interfaces designated 1-3, respectively. These interface designations are omitted from representations of network 100 in other Figures included herein to make other features shown in those drawings easier to see, but it should be understood that these designations can be assigned to interfaces of network 100 as depicted in those Figures as well. Beginning with node A, a portion 202 of a BIER-TE forwarding table (BTFT) is stored at node A. A forwarding table for BIER-TE may also be referred to as a Bit Forwarding TE (BFTE) table. Table portion 202 associates a link bit array (LBA) with each link to a BIER-TE-enabled node from node A. The link bit array is simply an array of bits having a single set bit corresponding to the bit position assigned to the corresponding link. Bit arrays illustrated in the tables herein may have the bits grouped into 4-bit subgroups for readability. The link bit array in the forwarding table may also be referred to a "bit mask" herein. In an embodiment, storing the bit position of a link in the form of a link bit array facilitates comparison of the link bit array to the message bit array in an incoming message. Alternatively, the bit position assigned to a link may in some embodiments be stored as simply the number of the bit position (e.g., "1" for link AB in table 202 and "10" for link AE). Such a bit position number may of course be stored as a number in any suitable numbering/coding system, including binary or hexadecimal.

In the "Link" column of the BTFTs of FIG. 2, a link between two of the BIER-TE-enabled nodes in network 100 is denoted by the letter designating the sending node of a link, followed by the letter designating the receiving node. For example, link AB designates a direct one-way link from node A to B, while AE designates an indirect (because these nodes are not directly connected in network 100) one-way link from node A to node E. A single letter is used to denote a "local" link at a node (i.e., a link from the BIER-TE protocol layer to the next higher protocol layer). This link notation is for convenience and ease of explanation, and may not reflect the way a link is identified in an actual forwarding table. Links may be stored in forwarding tables in various ways that will be recognized by one of ordinary skill in the art in view of this disclosure. For example, a forwarding table may include node addresses, may store sending and receiving ends of a link separately, and/or may include additional information about the type or properties of a link. In general, a BTFT for a BIER-TE-enabled node includes additional information not shown in the table portions of FIG. 2, such as additional forwarding instructions or ingress and egress interface information. In an embodiment, the bit position and link information in BTFT portion 202 is received from controller 130 over control link 132 once bit positions have been assigned to links within network 100. In an alternative embodiment, bit position and link information for table portion 202 is provided to node A through a manual configuration process.

Portion 202 of the BTFT for node A assigns bit position 1 to the direct link from node A to node B, and bit position 10 to the indirect link from node A to node E. These forwarding table entries reflect the two bit position assignments involving node A shown using a different notation in FIG. 1. Because there are only two bit position assignments involving node A, there are only two entries in the BTFT for node A. The forwarding table at each BIER-TE node includes entries only for links connecting that node to other BIER-TE nodes, and among those links to other BIER-TE nodes, only those links having an assigned bit position are included. Although a bit position is assigned to each direct connection between BIER-TE-enabled nodes in the simplified example of network 100, in other embodiments bit positions are not assigned to every direct link. In an embodiment, bit positions are assigned only to links that are needed to form paths or trees to be traveled by messages in the network.

Portion 204 of the BTFT for node B is also illustrated in FIG. 2. In the embodiment of FIG. 2, BTFT B includes both incoming and outgoing links. Link AB, having assigned bit position 1 and also included in the BTFT for node A, is represented in BTFT B as an incoming link to node B. Links BC and BE, having assigned bit positions 2 and 4, respectively, are outgoing links from node B included in BTFT B. The basic mechanism of BIER-TE forwarding at a node, described further in connection with FIG. 3 below, involves determining whether bit positions associated with outgoing links from the node include a set bit in the message bit array of the message to be forwarded. Inclusion of incoming links in a BTFT as well can be advantageous in some cases, however. In some embodiments, for example, bits in bit positions corresponding to incoming links are reset in the message bit array of the message being forwarded. This kind of reset procedure may prevent looping and duplication of messages; embodiments of reset procedures are discussed in more detail below. Depending on the timing of any reset procedure, bit positions corresponding to incoming links can be used in some embodiments in determining whether a message entering a node should be accepted by the node or rejected. Entries for incoming links in BTFT B and other forwarding tables shown in FIG. 2 may therefore be used in processes including these reset and checking procedures. In the link notation used in FIG. 2, the name of an incoming link has the letter representing the node in the second position (e.g., link AB is incoming to node B), while the names of outgoing links have the letter representing the node in the first position (e.g., link BC is outgoing from node B). In an embodiment a BTFT includes an additional field or column to indicate whether the link of a table entry is an incoming or outgoing link. In an alternative embodiment to that of FIG. 2, the BTFTs for each of the BIER-TE-enabled nodes include entries only for outgoing links from their respective nodes.

Comparison to the bit position assignments illustrated in FIG. 1 shows that the same assignments for links AB, BC and BE are reflected in BTFT portion 204. In an embodiment, the bit position and link information in BTFT portion 204 is received from controller 130 over a control link similar to control link 132. In an alternative embodiment, bit position and link information for table portion 204 is provided to node B through a manual configuration process.

Bit positions assigned to links connecting node C to other BIER-TE-enabled nodes are shown in portion 206 of a BTFT for node C. Table portion 206 includes links both incoming to and outgoing from node C, and the considerations discussed above in connection with node B apply to node C as well. Because the link between nodes C and E is a two-way link with a single assigned bit position, as discussed above in connection with FIG. 1, BTFT C includes two entries for bit position 6: one in each direction of the two-way link. Link EC is an incoming link to node C, while link CE is an outgoing link. In an alternative embodiment, BTFT C includes a single entry for the link between nodes C and E, and the entry includes an additional field or column indicating whether the link is a one-way or two-way link. Comparison to the bit position assignments illustrated in FIG. 1 shows that the same assignments for links BC, EC, CE and CD are reflected in BTFT portion 206. In an embodiment, the bit position and link information in BTFT portion 206 is received from controller 130 over a control link similar to control link 132. In an alternative embodiment, bit position and link information for table portion 206 is provided to node C through a manual configuration process.

Portion 208 of the BTFT for node D is also shown in FIG. 2. Node D is an egress node from the BIER-TE domain, and its BTFT includes a link to a higher protocol layer. Bit position 2 is assigned to incoming link CD, and bit position 9 is assigned to the link at node D to the next higher protocol layer. In addition, bit position 11 is assigned to each direction of a two-way link between nodes D and F, in a manner similar to that described above for nodes C and E. The entries in BTFT portion 208 correspond to the bit position assignments shown in FIG. 1 in connection with node D Like the other BIER-TE-enabled nodes of network 100, node D can receive information for storage in its BTFT from controller 130 or through a manual configuration process. Portion 212 of a BTFT for node F is also shown in FIG. 2, and is similar to the BTFT portion for node D. Bit position 5 in BTFT portion 212 is assigned to incoming link EF, bit position 8 is assigned to the link at node F to the next higher protocol layer, and bit position 11 is assigned to each direction of the link between nodes D and F.

The largest BTFT portion shown in FIG. 2 is for node E, including bit position assignments for three incoming links, two outgoing links and a link to the next higher protocol layer at node E. In the embodiment of network 100, node E is an egress node for messages sent to receiver 108 through CE node 116, and a core node for messages sent on to BIER-TE-enabled node F. Like the BTFT for node C, BTFT portion 210 for node E includes both incoming and outgoing links assigned to bit position 6 because of the two-way link between nodes C and E assigned to that bit position. The entries in BTFT portion 210 correspond to the bit position assignments shown in FIG. 1 in connection with node E. Like the other BIER-TE-enabled nodes of network 100, node E can receive information for storage in its BTFT from controller 130 or through a manual configuration process.

As noted above, the BTFTs illustrated in FIG. 2 generally include additional information not shown, including interface or port information, and BTFTs may have information and entries arranged differently than is shown in FIG. 2. For example, the BTFTs of FIG. 2 have entries for incoming links grouped separately than entries for outgoing links. In other embodiments a BTFT may have entries sorted by bit position number without regard for whether links are incoming or outgoing. As another example, the BTFTs of FIG. 2 include entries only for bit positions assigned to links connected to the node where the BTFT is stored. In an alternate embodiment, each BTFT includes an entry for every bit position in the bit array length used in the network, but entries are empty (have no link information) for bit positions not assigned to a link connected to that node.

In addition to populating the BIER-TE forwarding tables for each BIER-TE-enabled node, preparation for forwarding by BIER-TE includes storing of a BIER-TE message bit array for each multicast group to be forwarded using BIER-TE. An exemplary portion of a BIER-TE group path table (GPT) 214 is shown in FIG. 2. In an embodiment, the GPT of portion 214 is stored at ingress node A for use by node A in encapsulating incoming multicast packets for BIER-TE forwarding. In a further embodiment, the message bit array assigned to each multicast group is provided to node A by controller 130. Alternatively, message bit arrays for multicast groups are provided to node A through a manual configuration process. Portion 214 of the GPT for network 100 includes columns for a group identifier or address and for a message bit array to be assigned to messages in that group. In an embodiment, the group identifier or address in the GPT is the group identifier or address carried by the incoming multicast message. In another embodiment, the GPT includes multicast source information instead of or in addition to multicast group information. The message bit array (MBA) is the bit array to be carried by the message when it is encapsulated for BIER-TE forwarding. In a packet network, the message bit array may be called a packet bit array (PBA) herein. A message bit array or packet bit array may also be called a "bit string" herein. As used herein, the term bit array, bit string or bit mask refers to a set of bits that has a fixed or variable length.

The length of the bit arrays used in a particular BIER-TE network—i.e., the number of bits in the array—can be statically configured or dynamically assigned and distributed through the BIER-TE network. The bit array can have any suitable length. In an embodiment, the length is determined in view of the size and capabilities of the network. In one embodiment, the length of the bit array is between 8 and 4096 bits. In a further embodiment, the length of the bit array is between 256 and 1024 bits. The maximum bit array length value is determined, in one embodiment, by hardware or software limitations of the BIER-TE-enabled nodes in the BIER-TE network. In one embodiment, different BIER-TE-enabled nodes in the BIER-TE network have different maximum bit array lengths. For example, one BIER-TE-enabled node may have a maximum bit array length of 128 bits while another BIER-TE-enabled node may have a maximum bit array length of 256 bits. The number of links, or path segments, that can be represented by bit positions in a message bit array depends on the length of the array and the particular way in which the bit positions are assigned. In some situations, for example, a single bit position can be assigned to more than one network link.

Along with the BIER-TE forwarding tables, the GPT is in some embodiments populated with information received from controller 130. As noted above, controller 130 uses topology information and multicast group information in assigning bit positions and determining explicit paths and trees for multicast groups. In an embodiment, controller 130 and nodes in network 100 run an IGP, and controller 130 obtains topology information through IGP advertisements. In an alternative embodiment, BIER-TE-enabled nodes provide topology information (such as neighbor information) to controller 130 through a query or reporting process using a control protocol. In embodiments in which some or all of the BIER-TE-enabled nodes are not running an IGP, the nodes can still obtain neighbor information through, for example, Layer 2 handshaking or announcement protocols. In an embodiment, BIER-TE-enabled nodes obtain neighbor information using Address Resolution Protocol (ARP) or Neighbor Discovery Protocol (NDP).

As also noted above, multicast group information is in some embodiments provided to controller 130 by provider edge nodes such as nodes A, D, E and F in network 100. In another embodiment, controller 130 is in communication with customer edge nodes such as nodes 110, 112, 114 and 116 of network 100 and receives multicast group information from those nodes. In addition to topology information and multicast group information, rules or requirements related to a particular network or application may be used by controller 130 in determining explicit paths and trees for multicast groups. For example, error correction schemes in video transmission networks can require a video stream to be sent over two separate non-overlapping paths. Various traffic engineering rules and requirements are accounted for by controller 130 in some embodiments. As an example, shared risk group (SRG) information can be considered in some embodiments. In some embodiments, some or all of the above information used by controller 130 is provided to controller 130 through a manual configuration process. In another embodiment, explicit path or tree information is provided to controller 130 or to ingress node A through a manual configuration process.

Portion 214 of the GPT in FIG. 2 includes message bit arrays for two multicast groups. Group G1 is assigned an MBA of {0001 1111 0111} (shown here with spaces between groups of 4 bits for readability). The MBE for group G1 has set bits at bit positions (BPs) 1, 2, 3, 5, 6, 7, 8 and 9. Comparison to the links in the BTFTs for the BIER-TE-enabled nodes shows that the tree for group G1 includes links AB (BP 1), BC (BP 2), CD (BP 3), EF (BP 5), CE or EC (BP 6), E (local—BP 7), F (local—BP 8) and D (local—BP 9). The direction taken through the two-way link between nodes C and E becomes clear upon considering this set of links in view of the topology of network 100. Entering at node A, the G1 message is forwarded to node B and then node C, at which point it is replicated, with one copy forwarded to node D and one to node E. Bit position 6 therefore corresponds to link CE in the tree for group G1. A replica message is then sent from node E to node F, and another replica is decapsulated at E in accordance with the "local" link for node E. Forwarding of the G1 packet is described in more detail below in connection with FIG. 3.

Group G2 in GPT portion 214 is assigned an MBA of {0011 1011 0100}, with set bits at BPs 3, 5, 6, 8, 9, and 10. According to the BP assignments in the BIER-TE forwarding tables, the tree for group G2 includes links CD (BP 3), EF (BP 5), CE or EC (BP 6), F (local—BP 8), D (local—BP 9) and AE (BP 10). Considering this set of links in view of the topology of network 100, and assuming a G2 message enters the BIER-TE domain at node A, the message is forwarded first to node E where it is replicated, with one copy forwarded to node F and one to node C. Bit position 6 therefore corresponds to link EC in the tree for group G2. The message sent to node C is then forwarded to node D, where it is decapsulated in accordance with the "local" link for node D. The message copy sent to node F is also decapsulated, according to the "local" link for node F.

The direct-connected links and "loose" indirect links in BIER-TE are similar in some ways to direct-connected segments (or "adjacency segments") and indirect routed segments (or "nodal segments') that have been described for use in segment routing. Segment routing differs from BIER-TE in important ways, however. For example, in segment routing as currently defined a message carries identifiers for each segment of the path to be traversed, and the identifiers have to be arranged in the same order that the segments appear along the path. A node along the segment routed path typically reads only the one identifier corresponding to the position of that node along the path. In BIER-TE, by contrast, no particular ordering of bit positions carried by the packet is needed, as long as the same bit position assignments are used in the message bit array and the BIER-TE forwarding tables at each node. Because each BIER-TE node has in its forwarding table only the links with assigned bit positions that are connected to that node, the node can be presented with a bit array containing bits representing every link along an entire path or tree and pick out only the bit positions relevant to the links at that node. In effect, storage of only the relevant links in each node's BIER-TE forwarding table sets up a kind of self-assembly process for the path or tree, as a message starts its journey carrying bits reflecting the entire tree, but the bits are gradually used in building the path as the messages (or replica messages) progress from node to node. Because each BIER-TE node can access the message bit array containing bits representing all links in the remainder of the message's path or tree, and can replicate and send a message over any of the links that are connected to the node, multicast transmission is available using BIER-TE. This is in contrast to segment routing as currently defined, which is limited to unicast paths since only one path segment at a time is accessible to a node. The capability of BIER-TE to perform explicit-path forwarding in multicast does not mean that BIER-TE is limited to multicast, however. A BIER-TE bit array can also be used to define an explicit unicast path for a message. In some embodiments, a BIER-TE message bit array may provide a more compact encoding of a given explicit path than the set of segment identifiers needed to encode the same path in a segment routing implementation.

Figure 3:
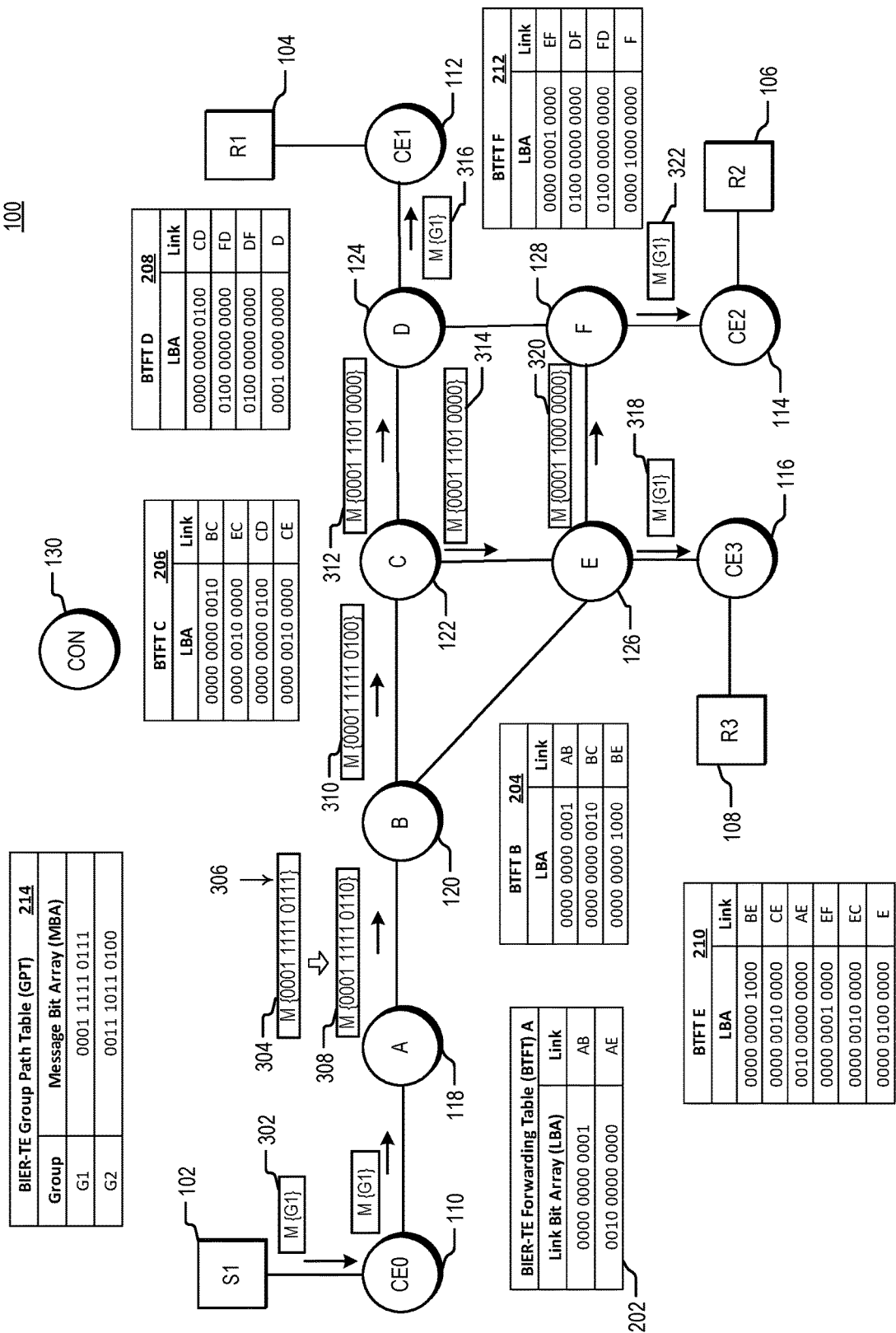
FIG. 3 is a simplified diagram illustrating message forwarding through an example network.

FIG. 3 illustrates the forwarding process through network 100 for a multicast message, such as a packet, frame or datagram, in multicast group G1. Network 100 appears as shown in FIGS. 1 and 2, along with GPT portion 214 and BTFT portions for nodes A through F as also shown in FIG. 2. Control link 132 shown in FIGS. 1 and 2 has been removed from FIG. 3, in part for clarity of the drawing but also to illustrate that communication between controller 130 and BIER-TE-enabled nodes is generally not required during actual forwarding of a message. Communication by controller 130 sets up network 100 for BIER-TE forwarding, and is subsequently used to update the GPT and/or forwarding tables in the case of any changes to the network or the multicast flows. In FIG. 3, icons representing multicast messages, such as original message 302 and BIER-TE-encapsulated message 304, are superimposed onto the diagram of network 100. The icons represent snapshots taken at successive times as the message (or replicas of the message) moves through the network in the direction of the arrows. At one point in time, for example, message 310 is moving from node B to node C. At a subsequent point in time, message 310 has been replicated and forwarded on, so that message replicas 312 and 314 are moving from node C toward nodes D and E, respectively. In the embodiment of FIG. 3, message 302 is sent from source host 102 through customer edge node 110 to BIER-TE ingress node A. Ingress node A uses the multicast group address and/or source address included in the multicast message to access its GPT and select a message bit array associated with the multicast group. After selecting an MBA that corresponds to the multicast group, node A encapsulates the message bit array into the multicast message, resulting in BIER-TE message 304.

In embodiments for which ingress node A is capable of multicast forwarding by other methods than BIER-TE, node A will need to determine that message 302 is to be encapsulated as BIER-TE. In one embodiment, node A checks each table it has stored for encapsulation of multicast messages (such as a GPT for BIER-TE or a group membership table (GMT) for non-TE BIER). If the multicast group or source information for the incoming multicast message is included in one of the available tables, the corresponding encapsulation is used. In a further embodiment, the tables are checked in a specified order, and the encapsulation corresponding to the first table including group or source information for the incoming message is used. In an alternative embodiment, the encapsulation of the incoming multicast message is extended to include an indication that BIER-TE forwarding should be used where available. In such an embodiment, node A checks the BIER-TE GPT for a message bit array to be applied to the incoming message.

Encapsulation of a message bit array onto message 302 to form BIER-TE message 304 can be accomplished in multiple ways. In an embodiment, an existing encapsulation is adapted or extended to carry BIER-TE information. For example, a message bit array is written to the destination address field of an Internet Protocol version 6 (IPv6) header in one embodiment for which the multicast message is an IP packet. In another embodiment, a message bit array is written to one or more IPv6 extension headers. As another example, an IP packet with an MPLS encapsulation is forwarded using one or more 32-bit labels inserted between the IP header and data link layer header of the packet. In one embodiment, BIER-TE-related information including the message bit array is included in a stack of MPLS labels. In an alternative embodiment the message bit array is encoded outside of the MPLS label structure, between the MPLS label stack and the payload of the packet. In a still further embodiment, the bit array may be included in a BIER-TE header appearing between the label stack and the payload, where the BIER-TE header may also include additional information. As an alternative to adapting an existing encapsulation in ways such as those described above, a dedicated BIER-TE encapsulation, such as a dedicated BIER-TE header, may be used in some embodiments. In a further embodiment, controller 130 communicates a BIER-TE encapsulation format to BIER-TE-enabled nodes in network 100.

When an incoming message has been encapsulated to form a BIER-TE message, node A proceeds with BIER-TE forwarding of the message. The basic BIER-TE forwarding mechanism is to determine whether any of the bit positions representing outgoing links in the forwarding node's BIER-TE forwarding table include set bits in the message bit array. If a set bit in the MBA shares the bit position of an outgoing link in the forwarding table, a replica of the packet is forwarded over the link. In one embodiment, determining whether any set bits in the MBA have the same bit position as links in the forwarding table includes representing the link in the forwarding table as a link bit array, where every bit in the LBA is set to zero except for the bit in the bit position assigned to the link. In a further embodiment, a logical AND operation is then performed between the message bit array and the link bit array. If the result of the AND operation is TRUE, the message bit array does have a set bit in the bit position assigned to the link. In another embodiment, the bit value for a bit position in the MBA corresponding to a link in the forwarding table is checked using a different operation. In yet another embodiment, bit positions for set bits in the message bit array are identified, and the BIER-TE forwarding table is then checked to determine whether there are links in the table corresponding to any of the identified bit positions.

Applying this mechanism to message 304 at node A of FIG. 3, the message bit array of message 304 is compared to the entries of BTFT portion 202. The BTFT for node A has only two bit positions corresponding to links: BP 1 for link AB and BP 10 for link AE. One of these, BP 1, corresponds to a set bit in the MBA of message 304. The message is therefore forwarded to node B over link AB. It is noted that the comparison of the MBA for message 304 with the entries of the BTFT for node A could have been carried out in multiple ways, including those described above. For example, a logical AND of the MBA of message 304 with the LBA for link AB in BTFT A gives a result of TRUE, while the same operation with the LBA for link AE in BTFT A gives a result of FALSE. A variation of this method is to first perform a logical OR of the link bit arrays of all outgoing links in the BTFT, then AND the result with the MBA and identify the bit positions of any set bits in the result of the AND operation. A replica of the message is then forwarded over any links corresponding to set bits. As another example, the bit positions of set bits in the MBA of message 304 can be considered one by one, checking the BTFT for a link associated with each bit position of a set bit. The result of this procedure is again that a message is forwarded over only link AB.

In an embodiment, BIER-TE forwarding over a directly-connected link such as that between nodes A and B is done by layer 2 (L2) forwarding rather than routing. In a further embodiment in which only directly-connected links are used, the BIER-TE-enabled nodes do not need to have routing tables or to run an IGP.

In the embodiment of FIG. 3, a reset operation is carried out at node A before message 304 is forwarded over link AB. Bit position 306 corresponds to the link that the message is forwarded over; the bit in this position is reset (set to 0, in the bit value convention used herein), resulting in message 308. Resetting of bits in each bit position corresponding to a link that the message is forwarded over ensures that the same message cannot be re-sent over the same link in the event of a loop in the network. In an embodiment, the reset procedure is performed using a reset bit mask associated with each BTFT. For the bit value convention used in FIG. 3, such a reset bit mask has a bit value of 0 at each bit position corresponding to a link the message is being forwarded over, and a 1 in every other position. In a further embodiment, each BTFT stores a reset bit mask having a 0 in each bit position corresponding to a link that a message can be forwarded over from that node. For example, the link bit arrays for each outgoing link in the BTFT can be ORed together, and the result inverted, so that the reset mask has a 0 in the bit position for each outgoing link in the table, and a 1 in every other bit position. In this way, the same reset bit mask can be used regardless of which links a particular message is actually forwarded over; bit positions for any unused links are set to 0 in the message bit array already, so that the reset mask has no effect on those bit positions of the MBA in the forwarded message. In a still further embodiment, the reset bit mask has a 0 in each bit position corresponding to either an incoming or outgoing link connected to the node. The reset procedures described herein are not needed in loop-free network topologies, and there are some bit position assignment scenarios requiring bits to not be reset.

Returning to the forwarding example of FIG. 3, BIER-TE-enabled node B receives message 308 from node A. In an embodiment in which node B forwards messages through other methods in addition to BIER-TE, node B first needs to determine that message 308 is a BIER-TE message. Identification of a message as a BIER-TE message can be included in the encapsulation of the message in various ways. In an embodiment for which BIER-TE is implemented in an MPLS network, for example, a specific uppermost MPLS label may be used to identify a BIER-TE message. Alternatively, a dedicated header or header field may be used to identify a message as a BIER-TE message.

When node B recognizes message 308 as a BIER-TE message, forwarding proceeds in a similar manner to that described above for node A. The message bit array in message 308 is compared to the forwarding table entries associated with outgoing links in the BTFT for node B. BTFT portion 204 for node B includes two bit positions assigned to outgoing links: BP 2 for link BC and BP 4 for link BE. The message bit array in message 308 has a set bit at BP 2 but not at BP 4. The message is therefore forwarded, in the manner discussed above for node A, to node C over link BC. In the embodiment of FIG. 3, node B also employs a reset procedure as discussed for node A above, so that forwarded message 310 has the bit at BP 2 reset. BIER-TE forwarding at node C proceeds in a similar manner as for node B. Portion 206 of the BTFT for node C includes two outgoing links: CD (with BP 3) and CE (with BP 6). The message bit array of incoming message 310 has a set bit at both BP 3 and BP 6. Message 310 is therefore replicated, with one copy, message 312, forwarded to node D over link CD and another, message 314, to node E over link CE. Node C also implements a bit reset procedure so that the bits at BP 3 and BP 6 are reset in each of the forwarded messages.

At node D, where message replica 312 is received, the outgoing links in the BTFT table are the local link for node D, at BP9, and link DF at BP 11. The message bit array for message 312 has a set bit at BP 9, so node D removes the BIER-TE encapsulation from the message, restoring the format of the original multicast message 302. The decapsulated message becomes message 316, which is handed off to the next higher protocol layer at node D (such as, for example, IP multicast or m-LDP) and then forwarded to receiver 104 via customer edge node 112.

At node E, where message replica 314 is received, there are three outgoing links in the BTFT: EC (with BP 6), EF (with BP 5) and the local link for node E, with BP 7. The message bit array for message 314 has set bits at bit positions 5 and 7, but not at BP 6. The two-way link between nodes E and C illustrates the importance of the bit reset procedure in certain situations. Because bit position 6 is assigned to both directions of the link between nodes C and E, a message would be sent back to node C from node E if BP 6 had not been reset at node C before forwarding of message 314. The message would continue to be sent back and forth between these nodes if the bit at BP 6 in the message bit array were not reset by either node. Instead, message 314 is replicated, with one copy forwarded to node F as message 320, and the other copy decapsulated to form message 318 in the original message format used outside of the BIER-TE domain. Message 320 is subsequently decapsulated at node F pursuant to the set bit at BP 8 in the message bit array of message 320, to form message 322. Messages 318 and 322 are forwarded to their respective receivers with the protocol used outside of the BIER-TE domain.

As shown by FIG. 3 and the description above, forwarding of a multicast message through the BIER-TE domain of FIG. 3 results in delivery of copies of the message to receivers 104, 106 and 108 via a specific predefined set of paths. It is noted that because of the reset procedure employed by the BIER-TE nodes in the example of FIG. 3, the comparison of the message bit array to the forwarding table entries at each node can include forwarding table entries for incoming links as well as outgoing links. The reset procedure of FIG. 3 ensures that no bits in the MBA of a message arriving at a node are set at bit positions corresponding to incoming links for the node.

Forwarding by BIER-TE is similar in some ways to forwarding by non-TE BIER, primarily in that both methods encode path information in a bit array carried by the message being forwarded, and the message bit array is compared to bit position information in a forwarding table at each node. As a result, both methods allow the forwarding nodes to be free of multicast state, such as stored tree information for multicast groups. There are important differences between the two methods, however. As one example, BIER-TE provides for explicit paths and trees because the BIER-TE message bit array includes bits corresponding to each link in the tree. In non-TE BIER, on the other hand, bits in the message bit array correspond to receiving nodes and the MBA does not carry explicit path information. The BIER and BIER-TE methods also differ in the operations performed at forwarding nodes. In BIER forwarding, each node maintains a routing table for making SPF-based determinations of which receiver nodes are reachable from each of the node's neighboring nodes. The reachable receiver nodes from each neighbor are reflected in a bit-indexed forwarding table created at each node. In a BIER-TE node, on the other hand, the forwarding table is populated by information provided by an external controller or by manual configuration. At least in the case of paths formed using only directly-connected links, a BIER-TE-enabled node does not require a routing table or any topology information beyond knowing its immediate neighbors. In some embodiments, a BIER-TE-enabled node does not run an IGP.

Failure Protection

The nodes and links that make up paths between a source and destination sometimes become unavailable due, for example, to physical disruption (e.g., a break in a cable), exceeding capacity, scheduled maintenance, and the like. When a node or link fails, network traffic can be interrupted. In the case of unicast networks running an IGP, the network typically reconverges (e.g., computes a new path and forwards network traffic around the failure using the new path), but doing so takes time and network traffic can be lost during the time taken to reconverge. It is desirable to minimize traffic loss. One technique for doing so is known as fast reroute (FRR). Fast reroute involves pre-computing backup paths. When fast reroute is employed, the time taken to redirect traffic is limited to the time taken to switch from a primary path to a backup path. Switching from a primary path to a backup path typically takes significantly less time than the time taken for the network to reconverge. One type of fast reroute, known as loop free alternate (LFA), ensures that the backup paths do not introduce loops.

One mechanism used in unicast routing to select backup paths is known as per-prefix LFA. When a path towards a node fails, a per-prefix LFA redirects traffic to a next-hop towards that node. However, this may be inefficient because redirecting traffic to that node may involve taking a less direct path to reach the ultimate destination than is available via a different node. Another issue is that with multicast routing, a packet may have multiple destinations, so what may be a next hop along the shortest path to one of the destinations indicated in the packet may not be the next hop on the shortest path to a second destination of the multicast packet. Thus, traditional per-prefix LFA is unsuitable for use with multicast networks.

In addition to not being suitable for multicast, the above-described unicast FRR methods are for use with a routing protocol such as an IGP. Except when remote links are used, BIER-TE does not need such a routing protocol. In an embodiment of a BIER-TE network, all links are direct-connected and no IGP is used. Unicast FRR techniques do not work in such an embodiment; without another solution, a message forwarded to a failed link or node will be dropped. In an embodiment, a BIER-TE node informs the network controller of any failed links or nodes. The controller will then determine revised paths or trees to encode into the bit arrays of subsequent messages to avoid the failure. This correction is typically relatively slow (on the order of seconds) to implement, however, with messages being dropped in the meantime.

Methods and network devices for intrinsic FRR for BIER-TE are disclosed herein. The intrinsic FRR uses one or more predefined backup paths reflected in a path update table associated with a network link. In the event of failure of the link, bit values in the message bit array of a message are modified according to data in the path update table. This modification encodes a backup path or tree to avoid the failed link (or node). Normal BIER-TE forwarding using the BTFT of the node is then performed. The intrinsic rerouting described herein is believed to take less than one second to achieve. In an embodiment, the intrinsic rerouting is believed to be achievable in times on the order of tens of milliseconds or less.

Figure 4:
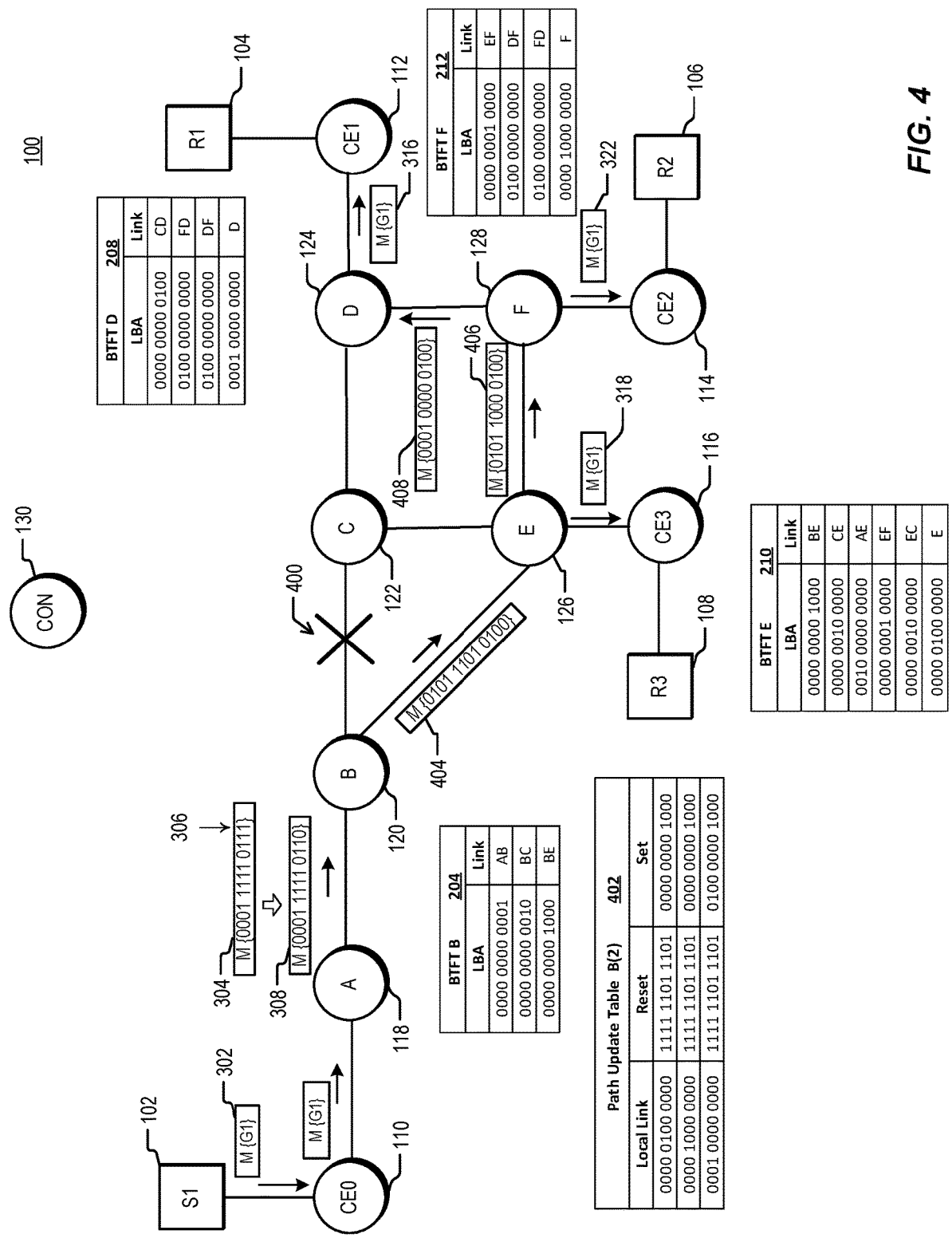
FIG. 4 is a simplified diagram illustrating message forwarding through an example network having a failed link.

An example of BIER-TE forwarding in a network having BIER-TE intrinsic FRR capability is illustrated in FIG. 4. FIG. 4 shows network 100 as in FIGS. 1, 2 and 3, except that in the embodiment of FIG. 4 network 100 includes failure 400 (designated by an "X") in link BC. Failure 400 could have various origins, such as a break in the physical connection between nodes B and C, an equipment malfunction, lack of capacity for the existing network traffic, or a closure for maintenance or repair. Node B can become aware of failure 400 through various mechanisms known to one of ordinary skill in the art in light of this disclosure. In networks running a routing protocol such as an IGP, for example, notification may be received via the protocol. Alternatively or in addition, a dedicated detection protocol such as Bidirectional Forwarding Detection (BFD) can be used to detect failure 400. In an embodiment, a node may register to be notified when a failure occurs. Another possible detection mechanism is packet-based probing with, for example, "keepalive" signals. As an example, a description of extensions to transport protocols directed to keep-alive functionality can be found in "Transport Layer Security (TLS) and Datagram Transport Layer Security (DTLS) Heartbeat Extension," by R. Seggelmann, M. Tuexen, and M. Williams, RFC 6520, February 2012, available at https://tools.ietf.org/pdf/rfc6520.pdf. In an embodiment, node B is programmed to set a flag or store an indication in a forwarding table upon learning of a network failure (and reset the flag or remove the indication upon learning that the failure has been removed). In such an embodiment, the failure may be more readily detected in the forwarding plane at the time of forwarding.

In addition to the FRR protection described further below, which is used to reroute existing messages around the failure, the BIER-TE network may operate to change primary paths or trees for messages not yet sent, so that these messages can reach their destinations without rerouting. In an embodiment, node B informs controller 130 of failure 400 upon learning of the failure. In a further embodiment, node B does not take time to inform controller 130 of the failure until after performing the time-sensitive FRR process for arriving messages. Alternatively or in addition, controller 130 learns of failure 400 independently, through a protocol or other mechanism. When controller 130 learns of failure 400, it can determine new primary paths or trees so that future BIER-TE messages do not encounter the failure. In an embodiment, these new paths or trees are encoded in revised message bit arrays and stored in group path table 214 of FIGS. 2 and 3 (certain tables shown in FIGS. 2 and 3 have been omitted from FIG. 4 for clarity). In the time before GPT 214 is updated, however, messages carrying message bit arrays including a set bit corresponding to the failed link will continue to arrive at node B for forwarding.

In the embodiment of FIG. 4, link BC is protected through use of path update table 402 stored at (or accessible by) node B. A path update table such as table 402 may also be referred to as a "bit adjacency set reset" or "BIER adjacency set reset" (BASR) table. The path update table stores information as to which bits in the message bit array need to be reset and which bits need to be set in order to modify the message bit array so that the network failure is avoided. In the embodiment of table 402, part of this information is in the form of a Reset bit mask that is combined with the original message bit array in a logical AND operation to cause one or more bits to be reset. Table 402 also includes a Set bit mask that is combined with the result of the reset operation in a logical OR operation to cause one or more bits to be set. The path update table is arranged into rows corresponding to the destinations of the message carrying the message bit array. In path update table 402, the destination nodes are represented by the bit positions of the "local," or decapsulation, links associated with each node. The first row of the "Local link" column of table 402, for example, stores a bit mask with a set bit in bit position 7, corresponding to the decapsulation link at node E. The remaining rows similarly correspond to nodes F and D, respectively. In this way, different backup paths may be encoded for messages having different destinations.

Controller 130 provides backup path information separately for each protected link (or node). The backup path information is stored for use by the node that would normally forward messages over the failed link (or to the failed node). According to the notation used in FIG. 4, table 402 is designated Path Update Table B(2) because it is for use by node B, and protecting the link associated with bit position 2 (link BC). In an embodiment where link BE is also protected, a separate table (not shown) would be designated Path Update Table B(4), because the protected link would be associated with bit position 4. Alternatively, the path update tables could be designated using the appropriate egress interface designations for the forwarding node. Using the egress interface numbers shown in FIG. 2, the path update table for protecting link BC could be designated B(2), while the table for protecting link BE would be designated B(3). Path update table 402, as well as any other tables described herein, is intended to illustrate the kinds of data being provided without limiting the format or arrangement of such data. Tables as described herein may have data arranged in multiple different ways, and may take the form of a database or some other data structure. Multiple tables for a single node may in an alternative embodiment take the form of portions of a single table. Single tables described herein may in alternate embodiments be split into more than one data structure. "Table" as used herein may refer to a relevant portion of a table or other data structure, or to a collection of multiple tables or data structures holding related data.

The forwarding process shown in FIG. 4 begins in the same way as the process of FIG. 3: with BIER-TE encapsulation of a multicast message M{G1}, and BIER-TE forwarding of the message from node A to node B. At node B it is determined that the message bit array in received BIER-TE message 308 has a set bit at BP 2, corresponding to link BC, and that link BC has failed. In an embodiment, node B informs controller 130 of the link failure, if node B has not done so previously. In such an embodiment, this notification will allow the controller to revise the BIER-TE message bit array that subsequent multicast messages in group G1 are encapsulated with. In some embodiments, any informing of the controller is not done until after node B carries out the FRR process described below for the packet at hand. In a further embodiment, node B informs the controller of the failure if the failure is expected to be relatively long-lasting, rather than temporary and brief. In another embodiment, node B informs controller 130 of all detected network failures, leaving the controller to determine whether a failure is expected to be sufficiently long-lasting for the BIER-TE path to be revised. In yet another embodiment, node B does not need to inform controller 130 of network failures because controller 130 has independent access to failure information.

Because backup path information exists (in path update table 402) for failed link BC, node B can perform a fast reroute procedure to update the path encoded in the message bit array of received message 308. Message 308 has set bits in bit positions 7, 8 and 9, so that each of the three rows of path update table 402 are applicable. The Reset bit masks are identical for the three rows of table 402, and will result in resetting of the bits in bit positions 2 and 6 of the message bit array of message 308. This resetting has the effect of removing links BC and CE from the encoded path. The Set bitmask in each of the three rows of table 402 sets the bit in bit position 4, corresponding to link BE. In addition, the Set bitmask in the third row of table 402, for a path with node D as a destination, also sets the bit in bit position 11 corresponding to link FD. This setting of bits has the effect of adding links BE and FD to the encoded path (in this case, a multicast tree) for message 308. When the message with this modified message bit array is then forwarded using BIER-TE forwarding table 204, it will be sent over link BE rather than BC (after resetting of bit position 4 according to the reset procedure used in the embodiment of FIGS. 3 and 4) as message 404.

Figure 5:
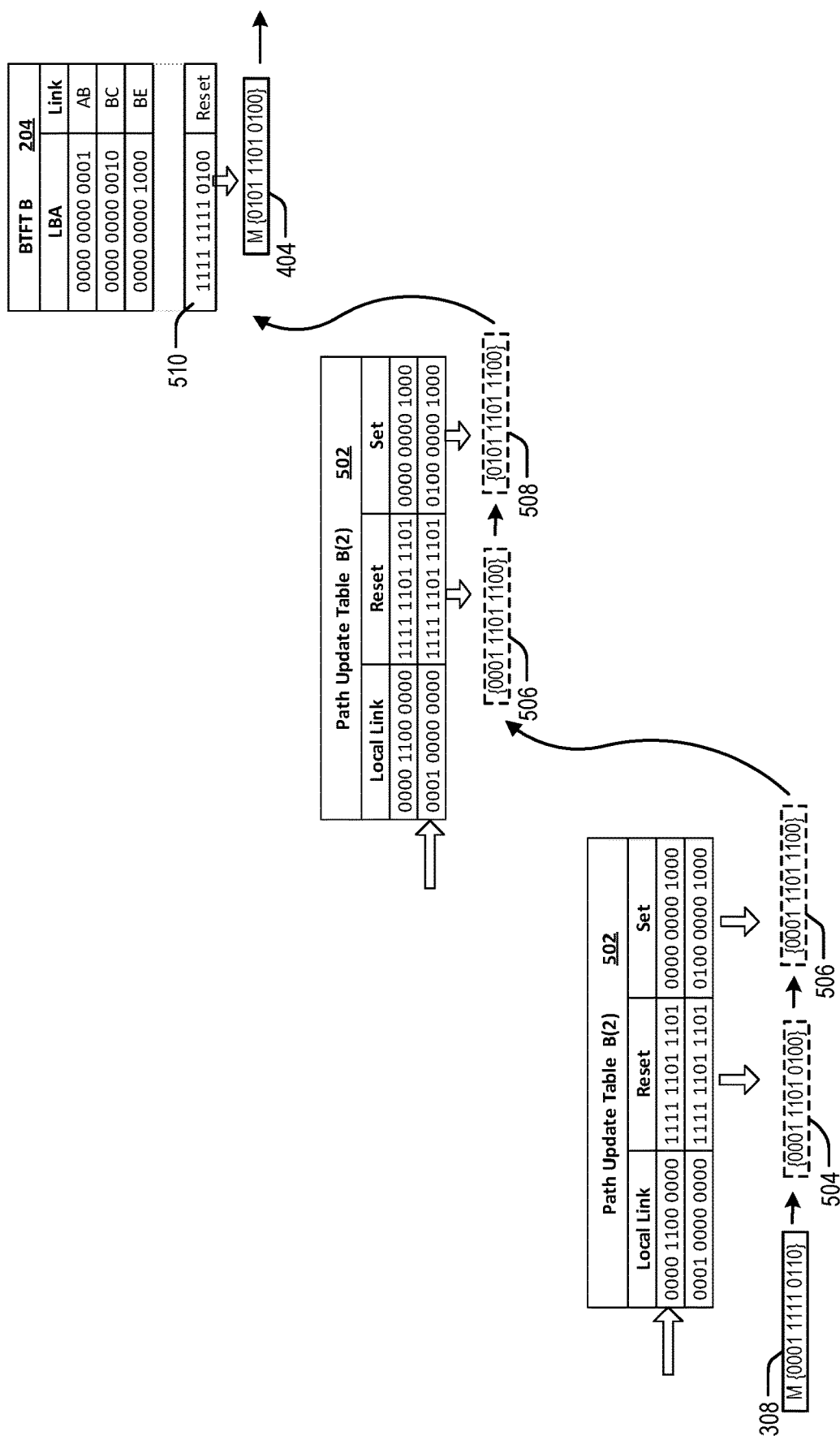
FIG. 5 is a simplified diagram illustrating message forwarding through an example network having a failed link.

A more detailed illustration of the effect on a message bit array of applying path update table 402 is shown in FIG. 5. FIG. 5 illustrates message 308 entering node B at the left of the drawing, and leaving node B as message 404 at the right of the drawing. In between are sequential illustrations of the message bit array at various stages of applying the path update table and BIER-TE forwarding table. Path update table 502 of FIG. 5 differs from table 402 of FIG. 4 only in that for table 502 the rows corresponding to destination nodes E and F (bit positions 7 and 8) have been combined. When the Reset and Set bit positions are the same for multiple destination nodes, those entries can be combined by including the bit positions corresponding to all of these destination nodes in the Local Link column. In the embodiment of FIGS. 4 and 5, this combining of entries can be achieved by combining the bit arrays in the Local Link column with a logical OR operation. It is noted that, like BIER-TE forwarding tables, BIER-TE path update tables may represent bit positions in multiple ways. For example, a simple list of bit positions representing local links, bits to be reset, or bits to be set could be included in the path update table, rather than the full bit array having bits set (or reset) in the appropriate positions. Depending on the length of the bit array and the number of bit positions to be identified or altered, a list of bit positions may be more efficient in some embodiments than a full bit array. In an embodiment, bit positions are encoded as numerals for storage in a table, and then temporarily represented as set bits in a bit array generated for purposes of performing one of the bitwise operations described herein.

In the embodiment of FIG. 5, when message 308 arrives at node B, and when node B has determined that rerouting is needed, the reroute process begins by applying the first row of table 502 to the message bit array of message 308. The first row gets applied because at least one of the bit positions with set bits in the Local Link column corresponds to a bit position with a set bit in the message bit array (in this case, both of bit positions 7 and 8 correspond to set bits in the message bit array of message 308). Continuing to the Reset column, the bit positions with "0" bits in the bit array in the Reset column are the bit positions that need to have reset bits in the message bit array. In an embodiment, the reset is performed by combining the message bit array with the bit array in the Reset column using a logical AND operation. The reset operation results in interim bit array 504, having newly reset bits in bit positions 2 and 6. Moving to the Set column, the bit positions with set bits in the bit array of the Set column are the bit positions that need to have set bits in the message bit array. In an embodiment, the set operation is performed by combining interim message bit array 504 with the bit array in the Set column using a logical OR operation. The set operation results in interim bit array 506, having a newly set bit in bit position 4.

The reroute process continues with application of the second row of table 502, because bit position 9 (from the Local Link column) corresponds to a set bit in the message bit array. The reset operation from the second row does not change the message bit array in this case, because the Reset bit arrays happen to be identical for both rows in table 502. The set operation has the effect of setting the bit in bit position 11 of the message bit array, resulting in interim message bit array 508. The BIER-TE forwarding process, as discussed in connection with FIG. 3 above, is then applied using message bit array 508 and BIER-TE forwarding table 204. Comparison of message bit array 508 to the link bit arrays in table 204 results in forwarding of the message over link BE (bit position 4) rather than the failed link BC (bit position 2). The reset process used in this embodiment can be achieved by combining interim message bit array 508 with reset mask 510. The reset process results in a reset of bit position 4 before the message is forwarded out of node B as message 404.

Returning to FIG. 4, the BIER-TE forwarding of message 404 continues in the manner described above in connection with FIG. 3. The set bits in the MBA of message 404 corresponding to outgoing links from node E are at bit positions 5 and 7. The message is therefore decapsulated and passed to the upper layer protocol as multicast message 318 (according to the local link corresponding to BP 7) and also replicated and forwarded to node F as message 406, after resetting of the bits in bit positions 5 and 7 of the message bit array. At node F, the set bits in the MBA of message 406 corresponding to outgoing links are at bit positions 8 and 11. Message 406 is therefore decapsulated and passed to the upper layer protocol as message 322 (according to bit position 8), and also replicated and forwarded to node D as message 408, after resetting of the bits in bit positions 8 and 11 of the message bit array. At node D, the only set bit in the message bit array of message 408 corresponding to an outgoing link is at bit position 9, corresponding to the local link for node D. The message is therefore decapsulated and passed to the upper protocol layer as message 316. It is noted that in the embodiment of FIGS. 4 and 5, the reroute process did not reset the bit at bit position 3 in the message bit array, corresponding to link CD. Because CD is a one-way link outgoing from node C and the updated path does not include node C, it is not necessary to reset the bit at that bit position (although it would be harmless to do so). If the link between nodes C and D were a two-way link, it would be necessary to reset the bit in the bit position for link CD, however.

Comparison of the forwarding paths illustrated by FIGS. 3 and 4 shows that the reroute process of FIG. 4 alters the multicast tree so that messages in multicast group G1 are routed through node E rather than node C to reach the same destinations. In the embodiment of FIG. 4, the backup path encoded by path update table 402 avoids node C entirely. This backup path can therefore be applied to a failure either of link BC or of node C, or both. In an embodiment, controller 130 is programmed to treat both the failure of a link from a first node to a second node and a failure of the second node itself as a failure of the second node, and to use the same backup path (one that avoids the second node) for both situations. This approach may be particularly suitable for networks in which the forwarding node may not be able to determine whether a failure is of a link or of the connected node. In an alternative embodiment, the controller is able to distinguish between a link failure and a neighboring node failure associated with a particular egress interface of a forwarding node, and is programmed to create separate path update tables for that interface to reroute around either the failed link or the failed node. In the case of the network shown in FIG. 4, for example, a path update table specific to rerouting around link BC (but not node C) could encode a backup path running from node B to node E and then back up to node C, since that path would not traverse link BC.

BIER-TE FRR Methods

Figure 6:
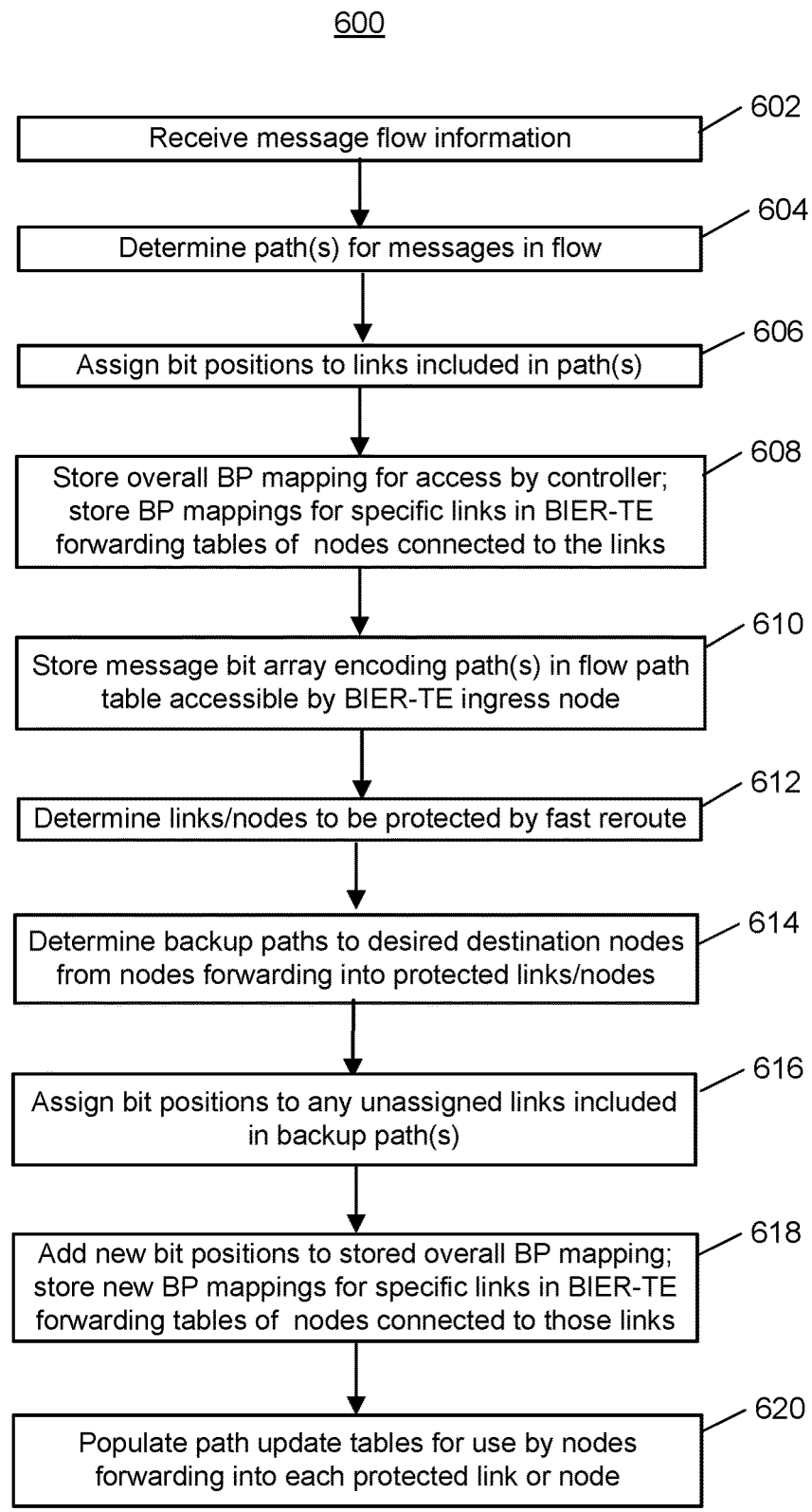
FIG. 6 is a flowchart illustrating an example of a process for setting up a BIER-TE network with fast reroute protection.

An example of a method for setting up a BIER-TE network with fast reroute capability is illustrated by the flowchart of FIG. 6. Method 600 of FIG. 6 is carried out by a network controller, or by a node or other device programmed to carry out network control functions. The method begins with receiving message flow information (step 602). A "flow" as used herein is a stream of one or more messages traveling between a particular source and a particular destination having a set of common properties. In an embodiment, the message flow information includes multicast group and/or source information. Alternatively, the message flow information relates to a unicast message flow, and includes, for example, ingress and egress node information for the flow. The message flow information is received from ingress or egress nodes of the network, in one embodiment. In an alternative embodiment, the message flow information is received through a manual configuration process.

Method 600 continues with determining paths for messages in the flow (step 604). As discussed in connection with the forwarding example above, network topology information is used along with message flow information to determine paths. Message flow information considered may include information regarding additional message flows in the network in addition to the particular message flow that a path is being determined for. In an embodiment, additional rules or requirements related to a particular network or application are also used in determining paths. For example, various traffic engineering considerations understood by one of ordinary skill in view of this disclosure are used in determining paths in certain embodiments. Determining a path in some embodiments involves receiving entry of a path through a manual configuration process. In an embodiment, the path determination of step 604 provides an initial path definition that may be altered and/or refined as method 600 proceeds and bit positions are assigned.

In step 606, bit positions are assigned to links included in the determined path or tree for the message flow. The links included in the path or tree can in various embodiments include any of the types of links discussed in connection with FIG. 1 above, such as directly-connected links, local decapsulation links, and indirect links. The reroute techniques described herein are believed to be most applicable to directly-connected links. A mapping of the assigned bit position(s) to their corresponding links is stored at the controller, or at a location accessible to the controller (step 608). In an embodiment, the bit position mapping is stored in a routing table configured to store information for populating forwarding tables at respective nodes along the path or tree. In addition to being stored for access by the controller, bit position mapping is also stored in the forwarding tables of nodes connected to the link in question. Forwarding tables 202, 204, 206, 208, 210 and 212 of FIG. 2 illustrate examples of this forwarding table storage of bit position mappings.

When bit positions have been assigned to links that combine to form the entire path or tree for the message flow, a message bit array for the message flow is stored (step 610). According to the bit convention used herein, the message bit array includes a set bit in each bit position corresponding to a link in the path or tree. In an embodiment, a mapping between the message bit array and an address or identifier for the message flow is stored in a group path table, or flow path table, at the BIER-TE ingress node for the message flow. The path determination, bit position assignment and storage of bit position mappings and message bit arrays of steps 604, 606, 608 and 610 of method 600 are performed for each message flow to be forwarded by a BIER-TE network or domain. Although shown as separate steps within method 600, it is noted that determination of a path or tree for a message flow and assignment of bit positions to links within the path may be interrelated processes in some embodiments. For example, path determination and bit position assignment may be iterated in some embodiments as part of an optimization process for arriving at a path or tree definition and a corresponding set of bit position assignments.

Method 600 continues with determining links and/or nodes within the BIER-TE paths or trees to be protected by a fast reroute process (step 612). The decision as to which links or nodes should be protected is of course very dependent on considerations such as the nature and topology of the network and the purpose of the message flow. In some embodiments, every outgoing link from every BIER-TE node is protected. In an embodiment, determining the links or nodes to be protected involves receiving entry through a manual configuration process of the links or nodes to be protected. It is noted that in some embodiments BIER-TE networks may have a single bit position assigned to multiple network links. The intrinsic BIER-TE fast reroute mechanisms described herein are believed to be best suited to protection of links associated with unique (within the BIER-TE network or domain) bit positions. For each protected link or node, process 600 continues with determination of one or more backup paths (step 614), where each backup path begins at a node configured to forward into the protected link or node and ends at a desired destination node for a message originally routed using the protected link or node. Considering protected link BC in FIG. 4 as an example, a backup path starting with node B would be determined, since node B is configured to forward into the protected link. In an embodiment in which message traffic also flows through the network in the opposite direction (from CE1 node 112 toward CE0 node 110, for example), it would be desirable to compute backup paths beginning at node C for traffic flowing in that direction. Which destination nodes the backup paths are determined for is dependent on the nature of the network. For example, in a network for which traffic is dominated by certain message flows, the desired destination nodes may be the destination nodes associated with those message flows. In a network without any particular dominant message flows, the desired destination nodes may include the destination nodes most frequently accessed using the protected link or node, as determined, for example, by network flow analysis. In an embodiment, entry of the desired destination nodes is received through a manual configuration process.

If any of the backup paths include links that do not have assigned bit positions, method 600 continues by assigning bit positions to the links (step 616). In an embodiment, bit positions in a BIER-TE network are assigned to links on an as-needed basis, as the links are incorporated into BIER-TE routed paths or trees. In such an embodiment, the number of available bit positions in the message bit array carried by messages, and therefore the number of links contained in paths through the network, is not unnecessarily reduced by assignment of positions to unused links. Any new bit position assignments made in step 616 are added to the stored bit position mappings for the controller and in the appropriate forwarding tables at nodes connected to the corresponding links (step 618). Finally, path update tables are populated with backup path information for use by the respective forwarding nodes for the protected links or nodes (step 620). The path update tables include the information needed to alter the message bit arrays of rerouted messages so that the message bit arrays encode the appropriate backup paths for avoiding the protected links or nodes in the event of failure. An exemplary method of populating a path update table is described in connection with FIG. 7A below.

The flowchart of FIG. 6 delineates the steps involved in one embodiment of a method for setting up a network of BIER-TE-enabled nodes to perform fast reroute as described herein. Various modifications of the method of FIG. 6 are apparent to one of ordinary skill in the art in view of this disclosure. For example, some of the steps of method 600 could be performed in a different order or in an interrelated way with other steps. For example, in method 600 primary paths and trees are determined and the associated bit positions are stored before backup paths are determined. In another embodiment, the primary paths and backup paths could both be determined before bit position assignment and storage. As another example, populating of the portions of the path update table may be performed in conjunction with determination of backup paths and assigning of new bit positions, as illustrated by the example of FIG. 7A below.

Figures 7A, 7B:
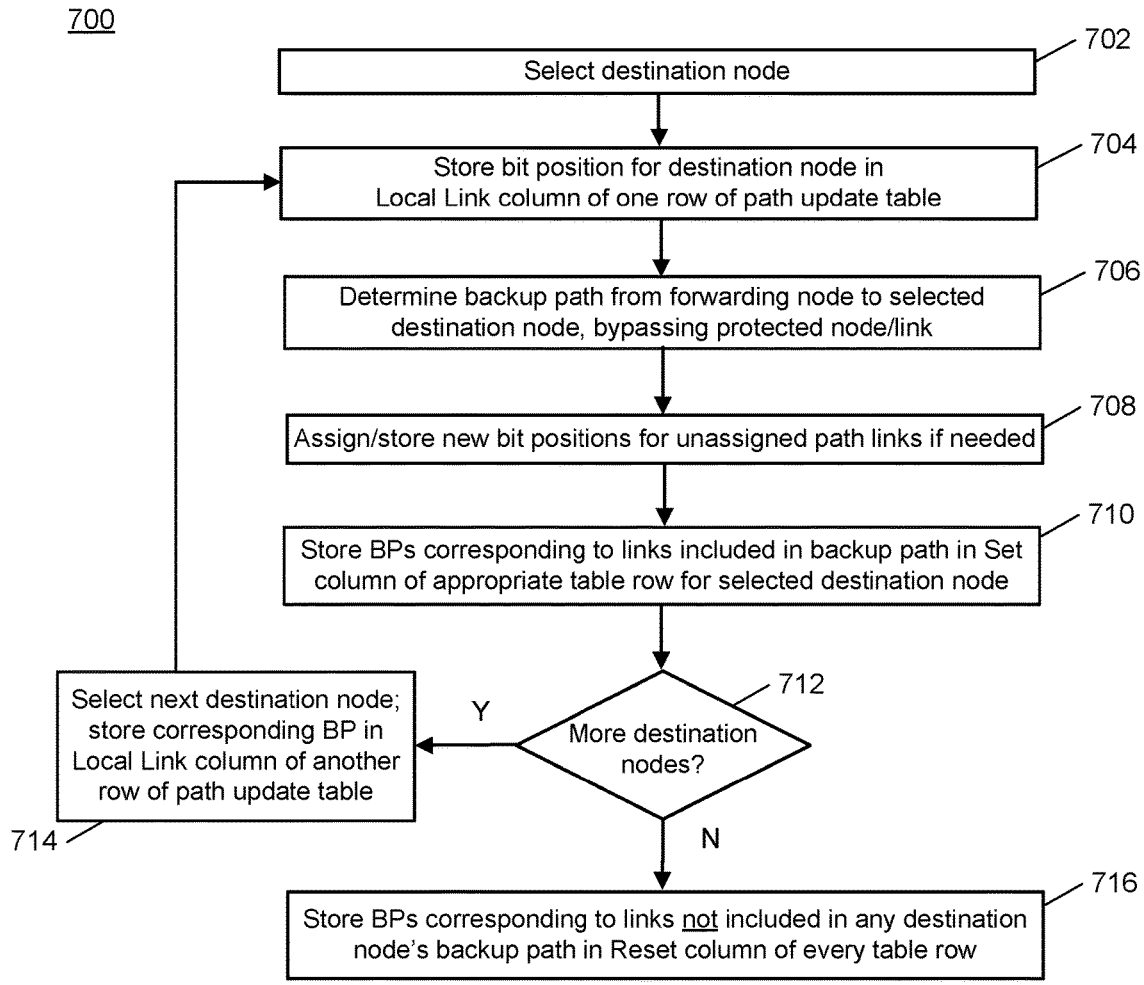
FIG. 7A is a flowchart illustrating an example of a process for populating a path update table.
FIG. 7B illustrates an example of a path update table populated using the process of FIG. 7A.

FIG. 7A illustrates an exemplary method of populating a path update table, as referenced in step 620 of FIG. 6. Method 700 of FIG. 7A is a method of populating a path update table such as table 402 of FIG. 4. The path update table being populated by method 700 is for use by a particular node that is configured to forward into a particular protected link or node, such as node B of FIG. 4 in relation to protected link BC. The approach of method 700 is believed to generate a suitably updated message bit array when applied to the rerouting example of FIG. 4, as discussed further in connection with FIG. 7B below. This approach may not be suitable for every rerouting situation, however, and other approaches can be used for the example of FIG. 4. In an alternative embodiment, population of a path update table such as table 402 is done through manual configuration. Method 700 begins with selection, in step 702, of a destination node to which a backup path to the forwarding node is desired. As noted above, desired destination nodes may be determined in various ways, such as by analyzing network traffic or by receiving entry of destination nodes through a configuration process. The bit position assigned to the destination node is stored in the Local Link column of one row of the path update table (step 704), where the path update table is of the form of table 402 of FIG. 4. In an embodiment, the assigned bit position is stored by storing the full array of bit positions used in the network, with a set bit in the bit position corresponding to the destination node. This is the approach of table 402 of FIG. 4, in which the set bit in bit position 7 of the top row of the Local Link column corresponds to node E of network 100. In an alternative embodiment, the assigned bit position could be encoded as a numeral in the Local Link column.

Method 700 continues with determination of a backup path from the forwarding node to the selected destination node, where the backup path bypasses the protected node or link (step 706). Step 706 is similar to step 614 of FIG. 6, except that the backup path of step 706 is determined for only the selected destination node and for only the particular path update table (at a particular forwarding node, for avoiding a particular link or node failure) being populated, while step 614 references a more generalized process of determining backup paths. In an embodiment, determining a backup path in step 706 is done by selecting a backup path that was previously determined and stored. If the backup path includes any links that do not yet have BIER-TE bit positions assigned, new bit positions are assigned and stored (step 708), in a manner similar to that described above for step 618 in FIG. 6. Bit positions corresponding to links included in the backup path are then stored in the Set column of the appropriate path update table row for the selected destination node (step 710). In the same manner described for other columns of the path update table, and of other tables described herein storing bit position information, the bit positions may be stored as set bits in appropriate bit positions of the entire BIER-TE bit array. Alternatively, the bit positions may be stored as a list of numerals.

After step 710 of method 700 is completed for the first time, the path update table being populated has a bit position representing the destination node stored in the Local Link column of one row, and a set of bit positions included in a backup path to that node stored in the Set column of the same row. In an embodiment, two or more alternate backup paths to the selected destination node are determined, to allow use of multiple paths for load balancing. In such an embodiment, the same Local Link entry could be made in two or more rows of the path update table, with different sets of bits stored in the Set column of each row reflecting the different backup paths. When bit positions for any backup paths to the selected destination node have been stored in the Set column of the appropriate row(s), the process is repeated for any additional destination nodes (steps 712 and 714). When the Local Link and Set columns have been populated for all of the destination nodes that backup paths are being determined for ("no" branch of decision step 712), the Reset column is populated in step 716. In the embodiment of method 700, bit positions corresponding to any links not included in any of the backup paths (for any destination node) are stored in the Reset column of every row in the path update table (step 716). In an embodiment for which the bit positions in the Set column are represented by set bits in the full bit array, the bit arrays in the Set column for all of the destination nodes can be combined using a logical OR operation. The resulting bit array will have a "0" in every bit position not corresponding to a link used in one of the backup paths. This bit array can then be stored in the Reset column because a logical AND operation between the message bit array and the bit array in the Reset column will cause the bit positions having a "0" in the Reset column bit array to be reset. In the embodiment of FIG. 7A, the bit positions stored in the Reset column are identical for every destination node.

FIG. 7B illustrates an example path update table 720 reflecting use of the process of FIG. 7A to populate path update table 402 of FIG. 4. The possible destination nodes for a path from node B in network 100 that would be affected by the failure of link BC are nodes D, with a bit position of 9 for its local link, E, with a bit position of 7, and F, with a bit position of 8. The local link bit positions of nodes E, F and D are therefore reflected in the set bits of the Local Link column in respective rows of path update table 720. For destination node E, in the top row of table 720, the links needed for a backup path from node B that bypasses link BC are link BE (with bit position 4) and local link E (BP 7). Bit positions 4 and 7 are therefore the only ones with set bits in the Set column of the top row of table 720. The backup paths to nodes F and D used in the example of FIG. 4 can be encoded in a similar manner, with the Set column reflecting bit positions 4, 5 and 8 for destination node F and bit positions 4, 5, 9 and 11 for destination node D. To populate the Reset column, combining the three Set column entries with a logical OR results in a bit array having set bits in bit positions 4, 5, 7, 8, 9 and 11. A bit array with each of these bits set is therefore stored in each row of the Reset column of table 720. The effect of applying the reset and set procedures encoded in table 720 to the message bit array of message 308 from FIG. 4 can be tested in the manner discussed in connection with FIG. 5 above. Although the Reset and Set column entries in table 720 of FIG. 7B are somewhat different than those of table 402 of FIG. 4, the same altered message bit array results from application of table 720 as from application of table 402.

Figure 8A:
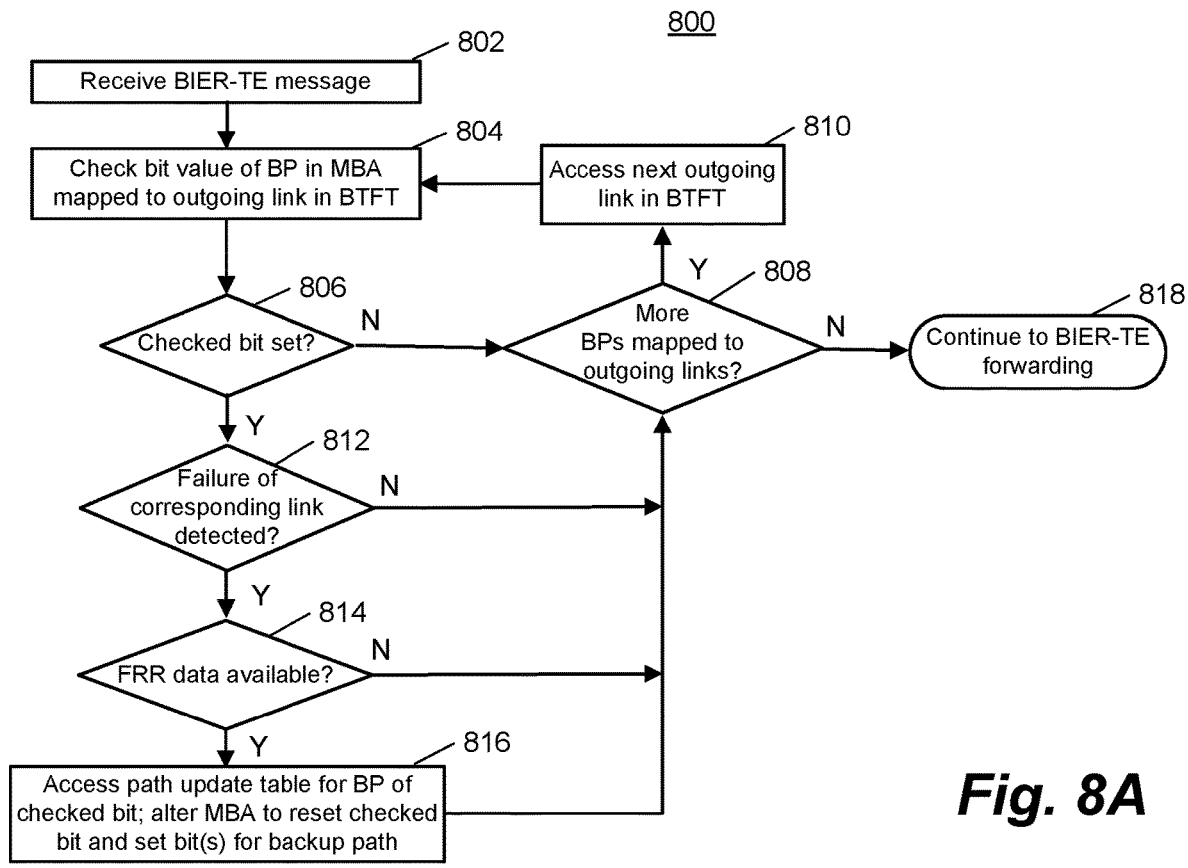
FIG. 8A is a flowchart illustrating an example of a process carried out by a node of a network described herein.

FIG. 8A is a flowchart illustrating an example of a method of BIER-TE forwarding incorporating intrinsic fast reroute of protected links or nodes. Method 800 of FIG. 8A is performed by a BIER-TE-enabled network node, such as node B of FIG. 4, configured to provide intrinsic BIER-TE FRR protection. The method begins in step 802 with receiving at the node a BIER-TE message, i.e., a message encapsulated with a BIER-TE message bit array (MBA). The message bit array of the message and the BIER-TE forwarding table at the node are then checked for a link connected to the node that is included in the path encoded by the message bit array. In the embodiment of FIG. 8A, a bit position corresponding to an outgoing link for the node is identified, and the value of the bit at that position in the MBA is checked (step 804). If the checked bit is set, the outgoing link is included in the encoded path for the message ("yes" branch of step 806). Bit positions for outgoing links are identified in the BIER-TE forwarding table (BTFT) for the node, such as BTFT 204 of FIG. 4. In an embodiment in which a full link bit array is included in the BTFT for each outgoing link, with a set bit in the bit position of the link, the bit value of the MBA bit in the bit position of the outgoing link may be checked by performing a bitwise logical AND between the MBA and the link bit array for the outgoing link. A "TRUE" result of the operation indicates that checked MBA bit is set. This determination of whether an outgoing link for the node is part of the encoded path for the message is discussed further above in connection with the basic BIER-TE forwarding process of FIG. 3. The alternative approaches to this determination described in connection with FIG. 3 are also applicable to this part of method 800.

If the checked MBA bit is not set ("no" branch of step 806), the next outgoing link in the forwarding table is checked ("yes" branch of step 808, step 810). If the checked bit is set, method 800 continues by checking whether a failure of the outgoing link has been detected (step 812). As noted above in connection with the discussion of failure 400 in FIG. 4, there are various mechanisms of checking for a link or node failure that will be apparent to one of ordinary skill in the art in view of this disclosure. In various embodiments, for example, such checking may be performed using a routing protocol, a dedicated failure detection protocol, or through packet-based probing. In an embodiment, the node has registered for notification of a failure, and checking for a failure includes determining whether a notification of a failure has been received. In an embodiment, checking for failure of a connected link or node may include checking a flag or other indication within the BIER-TE forwarding table, where the flag is set or other indication is stored by a mechanism outside of method 800 upon detection of a failure. If the outgoing link (or connected node) being checked has not failed ("no" branch of step 812), the method begins again with the next outgoing link in the forwarding table. If a failure of the link is detected ("yes" branch of step 812), the method continues with checking whether FRR data for the failed link is available at the forwarding node (step 814). In an embodiment, checking for FRR data involves checking whether the node has a path update table for protection of the link or node in question, and, if so, whether the path update table is populated with data.

If fast reroute data is available ("yes" branch of step 814), the appropriate path update table is accessed, and the message bit array is altered by resetting the bit in the MBA corresponding to the failed link (the "checked bit" referenced in the flow chart of FIG. 8A) and setting one or more bits in bit positions corresponding to links in the backup path to be taken (step 816). The alteration of the message bit array may also include resetting one or more additional bits in the MBA corresponding to links not included in the backup path or tree. An embodiment of a method of using the path update table to alter the message bit array is described below in connection with FIG. 8B.

Continuing with method 800, after alteration of the message bit array in step 816 of method 800, the method is repeated for any remaining outgoing links from the node (step 808). When all of the outgoing links have been checked, BIER-TE forwarding using the BIER-TE forwarding table can begin ("no" branch of step 808, step 818). An embodiment of a BIER-TE forwarding process is discussed below in connection with FIG. 8C. The overall effect of method 800 is to check, for each outgoing link from the node, whether that link is included in the message bit array of the incoming message. If the link is in the path for the message, the method checks whether the link (or a node connected by the link) has failed. If the link or node has failed, and FRR data is available, the MBE of the incoming message is altered to encode a backup path to avoid the failed link or node. The process is repeated for all outgoing links, and then the message, with its message bit array altered if necessary, is ready for BIER-TE forwarding. Variations in the method of FIG. 8A will be apparent to one of ordinary skill in the art in view of this disclosure. For example, in some embodiments the method could reorder the steps of method 800 by first checking for a failed link associated with the node, and checking whether any FRR data was available for any failed link, and if so, then seeing whether the failed link was included in the path for an incoming message.

Figure 8B:
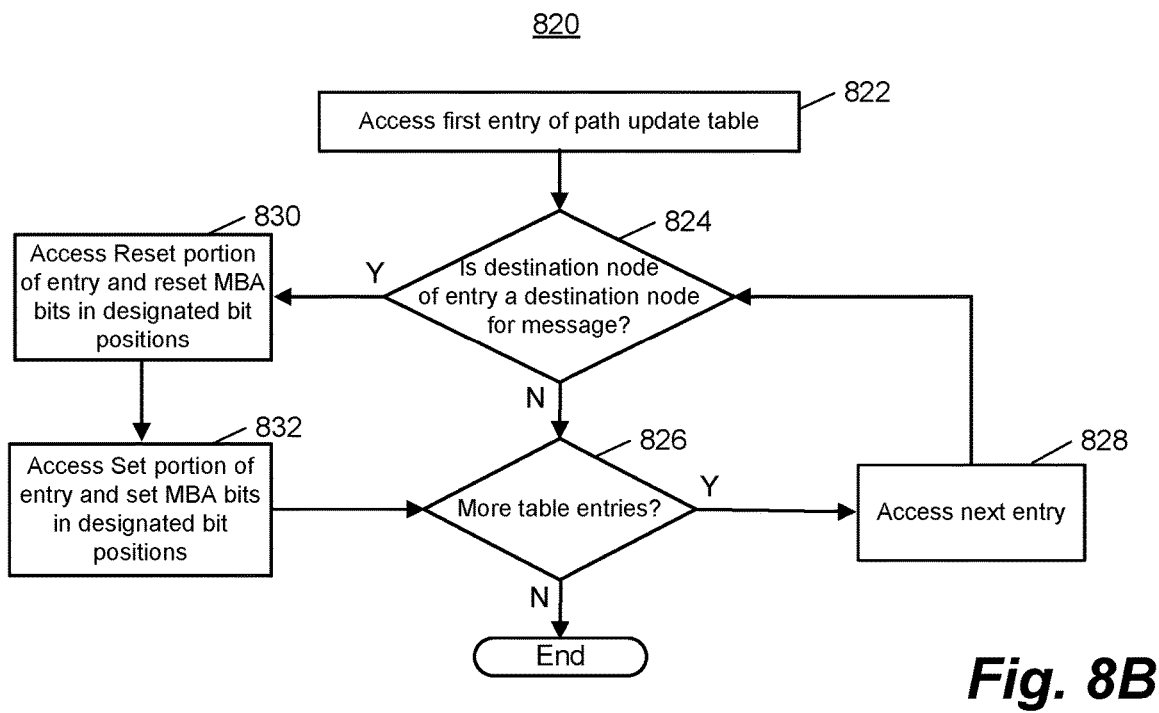
FIG. 8B is a flowchart illustrating an example of a process carried out by a node of a network described herein.

FIG. 8B is a flowchart illustrating an example of a method for using a path update table to alter a message bit array. Method 820 of FIG. 8b can be viewed as an expansion of step 816 of method 800 of FIG. 8A. Method 820 begins, at step 822, with accessing a first entry of a path update table, such as table 402 of FIG. 4. The method then determines, at step 824, whether the destination node associated with the entry is a destination node for the message having its bit position altered. In an embodiment, the table entry may be a combined entry applicable to more than one destination node, in which case the inquiry of step 824 is whether any destination node from the table entry is a destination node for the message. One or more BIER-TE bit positions corresponding to destination nodes for the table entry are included in the entry. In an embodiment such as that of table 402, the destination node bit positions are included in a Local Link portion of the entry (or column of the table). To determine whether the destination nodes from the table entry are destination nodes for the message, bit values in the message bit array are checked at the bit positions corresponding to the destination nodes from the table entry. In an embodiment, these bit values are checked by performing a bitwise logical AND between the message bit array and a bit array having bits set only in the destination node bit positions from the table entry. If the result of the AND operation is TRUE, a destination node from the table entry is also a destination node for the message. If no destination node from the table entry is a destination node for the message ("no" branch of step 824), the method begins again with the next path update table entry (steps 826 and 828).

If a destination node from the table entry is a destination node for the message ("yes" branch of step 824), reroute data from the table entry is used to alter the message bit array of the message. In step 830, a Reset portion of the entry is accessed to obtain bit positions of bits in the message bit array that need to be reset. In an embodiment, the bit positions in the Reset portion of the entry are represented by reset bits ("0" values) in a bit array having the bit position assignments used in the BIER-TE network, while other bits in the bit array are set to "1". In a further embodiment, the reset operation of step 830 includes a bitwise AND operation between the bit array from the Reset portion of the entry and the message bit array. The result of the bitwise AND operation replaces the message bit array of the message. The method continues, in step 832, with accessing of a Set portion of the path update table entry. The Set portion of the table entry contains bit positions of bits in the message bit array that need to be set. In an embodiment, the bit positions in the Set portion of the entry are represented as set bits ("1" values) in a bit array having the bit position assignments used in the BIER-TE network, while other bits in the bit array are set to "0". In a further embodiment, the set operation of step 832 includes a bitwise OR operation between the bit array from the Set portion of the entry and the message bit array (which has been partially altered by the reset operation). The result of the bitwise OR operation again replaces the message bit array of the message. The process of method 820 then repeats for any additional table entries (steps 826 and 828). When all table entries have been accessed and, if applicable, applied to the message bit array, the message bit array alteration method ends ("no" branch of step 826). When method 820 is performed as step 816 of method 800 in FIG. 8A, it can be seen that the end of method 820 would feed back to step 808 in method 800, to check for other link failures that might require alteration of the message bit array.

Figure 8C:
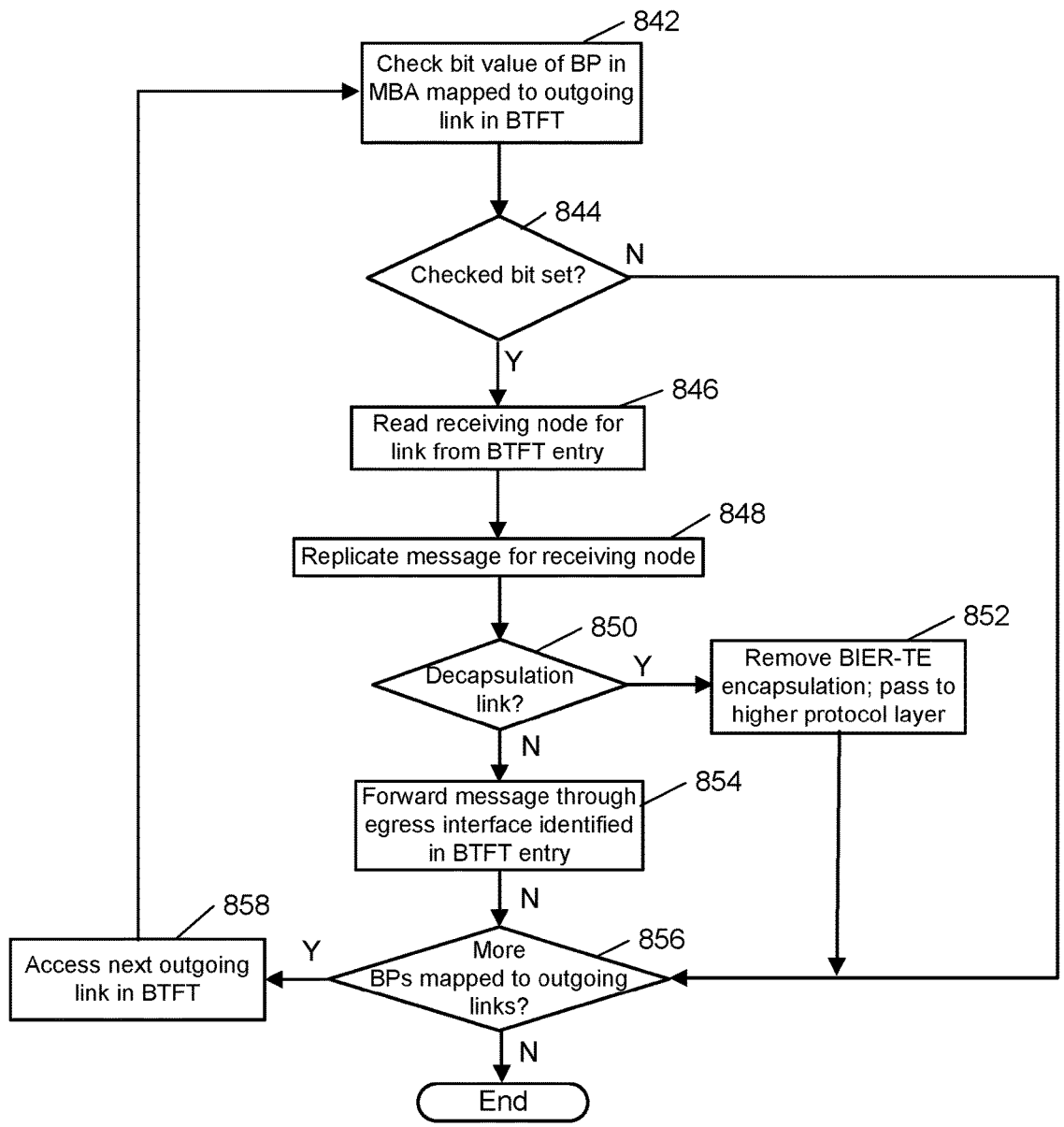
FIG. 8C is a flowchart illustrating an example of a process carried out by a node of a network described herein.

FIG. 8C is a flowchart illustrating an example of a method of BIER-TE forwarding after any FRR procedures have completed. As such, method 840 of FIG. 8C can be viewed as a substitute for step 814 of FIG. 8A. Method 840 illustrates a BIER-TE forwarding process similar to that described above in connection with FIG. 3. The embodiment of method 840 is for a basic BIER-TE forwarding method that does not include, for example, reset procedures or the use of indirect links such as link AE of FIG. 3. These and other variations are included in other embodiments of BIER-TE forwarding methods, as described elsewhere in this disclosure. Method 840 begins by checking whether an outgoing link for the node is included in the path encoded by the message bit array. In the embodiment of FIG. 8C, a bit position corresponding to an outgoing link for the node is identified, and the value of the bit at that position in the MBA is checked (step 842). If the checked bit is set, the outgoing link is included in the encoded path for the message ("yes" branch of step 844). Bit positions for outgoing links are identified in the BIER-TE forwarding table (BTFT) for the node, such as BTFT 204 of FIG. 3. Steps 842 and 844 of method 840 are identical to steps 804 and 806 of method 800 in FIG. 8A, and the variations and alternatives described in connection with steps 804 and 806 are also applicable to steps 842 and 844.

If the checked MBA bit is not set ("no" branch of step 844), the next outgoing link in the forwarding table is checked ("yes" branch of step 856, step 858). If the checked bit is set, method 840 continues by reading from the BTFT the receiving node of the outgoing link (step 846). As can be seen in, for example, BTFT 204 in FIG. 3, each entry in the BTFT for a node is associated with a link connected to the node. According to the link notation used herein, the receiving node for outgoing link BC in BTFT 204 is node C, and the receiving node for link BE is node E. For a decapsulation link such as link E in BTFT 210 of FIG. 3, the receiving node can be considered to be the next higher protocol layer. The message is replicated for the receiving node of the link (step 848). If the link is a decapsulation link ("yes" branch of step 850, the BIER-TE encapsulation is removed and the message is passed to the next higher protocol layer (step 852). Otherwise, the message is forwarded through the appropriate egress interface toward the receiving node (step 854). In an embodiment, the appropriate egress interface is included in the BTFT entry. Method 840 is repeated for any additional outgoing links from the node ("yes" branch of step 856, step 858).

Figure 9:
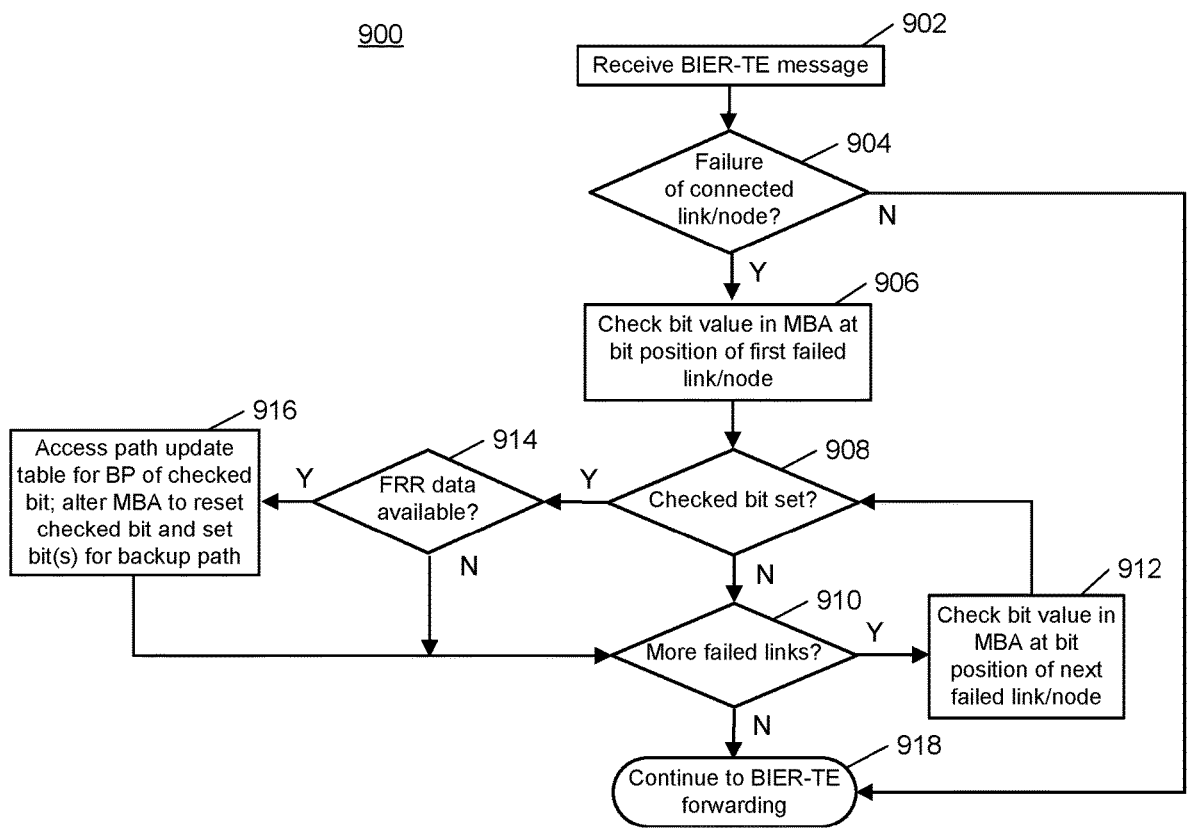
FIG. 9 is a flowchart illustrating an example of a process carried out by a node of a network described herein.

FIG. 9 is a flowchart illustrating an additional embodiment of a BIER-TE forwarding process incorporating intrinsic fast reroute. Method 900 of FIG. 9 is an alternative to method 800 of FIG. 8A. Method 900 begins with receiving a BIER-TE message, at step 902. The method continues with a determination of whether there are any failures of links or nodes connected to the forwarding node (step 904). Detection of failures can be performed by any of various methods understood by those of ordinary skill in the art in light of this disclosure, as discussed above in connection with, for example, FIGS. 4 and 8A. In an embodiment for which more than one failure of a connected link or node is detected, method 900 also includes storing identifiers of the failed links or nodes so that operations within method 900 can be performed for each failed link in turn. If no failed link or node is detected ("no" branch of step 904), there is no fast reroute needed for the received message, and BIER-TE forwarding of the message begins (step 918).

If a failed link or node is detected ("yes" branch of step 904), the method determines whether a bit position associated with the failed link or node is associated with a set bit in the message bit array of the received BIER-TE message (step 906). A set bit in the MBA at the bit position corresponding to the failed link or node indicates that the failed link/node is part of the intended path for the BIER-TE message. If this is the case ("yes" branch of step 908) the method determines whether FRR data for the failed link or node is available at the forwarding node. In an embodiment, this determination includes checking for a populated path update table corresponding to the bit position or egress interface associated with the failed link or node. If FRR data is available ("yes" branch of step 914), the MBA of the message is altered by resetting the checked bit (corresponding to the failed link) and setting one or more other bits, as indicated by one or more entries in the path update table (step 916). Method 820 in FIG. 8B is an example of a process for the MBA alteration in step 916. After the MBA alteration of step 916 is performed, or in the event there is no FRR data available for a reroute process ("no" branch of step 914), the method returns to see whether other failed links or nodes were detected in step 904 (step 910). If so ("yes" branch of step 910), the method determines whether a bit position associated with the next failed link or node is associated with a set bit in the message bit array of the received BIER-TE message (steps 912, 908). If so, and there is FRR data available for the next failed link or node, the MBA of the BIER-TE message is altered again using the path update table corresponding to the next failed link or node. When there are no more failed links or nodes to process, the message is forwarded using the BIER-TE forwarding table for the node (step 918).

BIER-TE FRR Network Devices

Figure 10A:
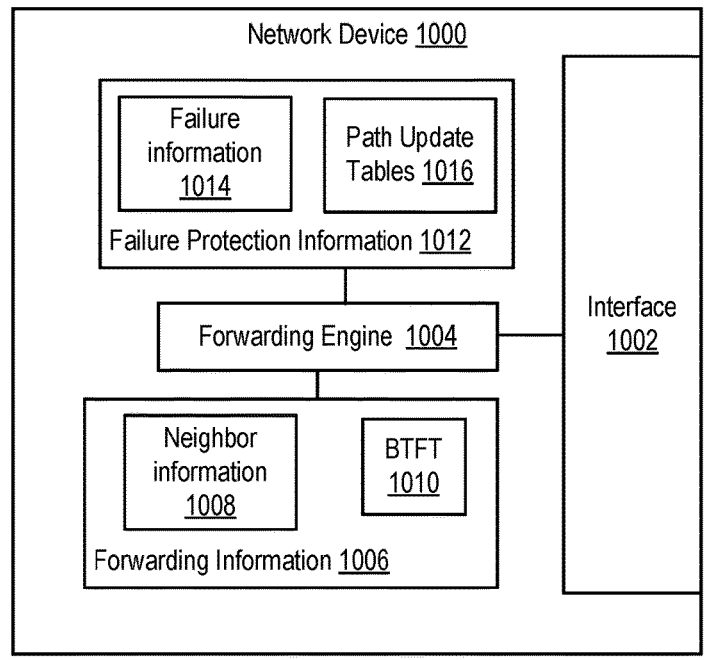
FIGS. 10A through 10D are simplified block diagrams illustrating certain components of example network devices that can be employed in the networks described herein.

FIG. 10A is a block diagram illustrating certain components of an exemplary network device that may be associated with a node in one of the networks described herein. Network device 1000 may, for example, be associated with a core router or egress router in network 100 of FIGS. 1 through 4. In the embodiment of FIG. 10A, network device 1000 includes a forwarding engine 1004, forwarding information 1006, communication interface 1002 and failure protection information 1012. In an embodiment, communication interface 1002 comprises multiple interfaces, and is configured both for sending and receiving messages within a network and for sending and receiving control information, either between network nodes or between the network device and a controller. Each interface may be a physical interface or a logical interface.

Forwarding engine 1004 is configured to forward messages using stored forwarding information 1006. For example, forwarding engine 1004 may perform a forwarding process similar to that illustrated in FIGS. 3 and 8C. Forwarding information 1006 is used by forwarding engine 1004. In the embodiment of FIG. 10A, forwarding information 1006 includes neighbor information 1008 and a BIER-TE forwarding table 1010. In an embodiment, neighbor information 1008 is obtained through operation of a protocol other than an IGP, such as a Layer 2 handshaking or announcement protocol. BTFT 1010 includes any mappings of BIER-TE bit positions to links of the node associated with network device 1000. In an embodiment, network device 1000 does not store topology or routing information, and links mapped to bit positions in BTFT 1010 do not include indirect, or routed, links. In such an embodiment, links represented in BTFT 1010 are either directly-connected links or decapsulation links as described in this disclosure. Neighbor information 1008 and BTFT 1010 include information received over interface 1002 from network devices at other nodes and/or from a network controller. In the embodiment of FIG. 10A, communication over interface 1002 is handled via forwarding engine 1004. In other embodiments, storing and updating of forwarding information 1006 may be done through a separate connection to interface 1002, such as via a communication module not shown in FIG. 10A.

In the embodiment of FIG. 10A, forwarding engine 1004 is also configured to use failure protection information 1012 when forwarding messages. Failure protection information 1012 includes failure information 1014 and path update tables 1016. In an embodiment, failure information 1014 includes information regarding failures to links directly connected to the node associated with network device 1000. Alternatively or in addition to information regarding failures to links connected to the node, failure information 1014 in some embodiments includes information regarding failures to nodes directly connected to the node associated with network device 1000. Failure information 1014 is based on communications received over interface 2002. In an embodiment, these communications involve operation of a protocol other than an IGP, such as Layer 2 handshaking or announcement protocol, a dedicated detection protocol, or packet-based probing. In some embodiments, information regarding link or node failures is alternatively or in addition stored in BIER-TE forwarding table 1010 within forwarding information 1006.

Path update tables 1016 are used to alter the message bit array of a BIER-TE message to encode a backup path to avoid a failed link or node. A separate path update table is included in path update tables 1016 for each BIER-TE bit position associated with a protected link or node. In an embodiment, separate path update tables are included in path update tables 1016 for a protected link connected to the node associated with network device 1000 and for a protected node at the other end of the protected link. Examples of path update tables described herein include tables 402 of FIG. 4, 502 of FIG. 5 and 720 of FIG. 7B.

Figure 10B:
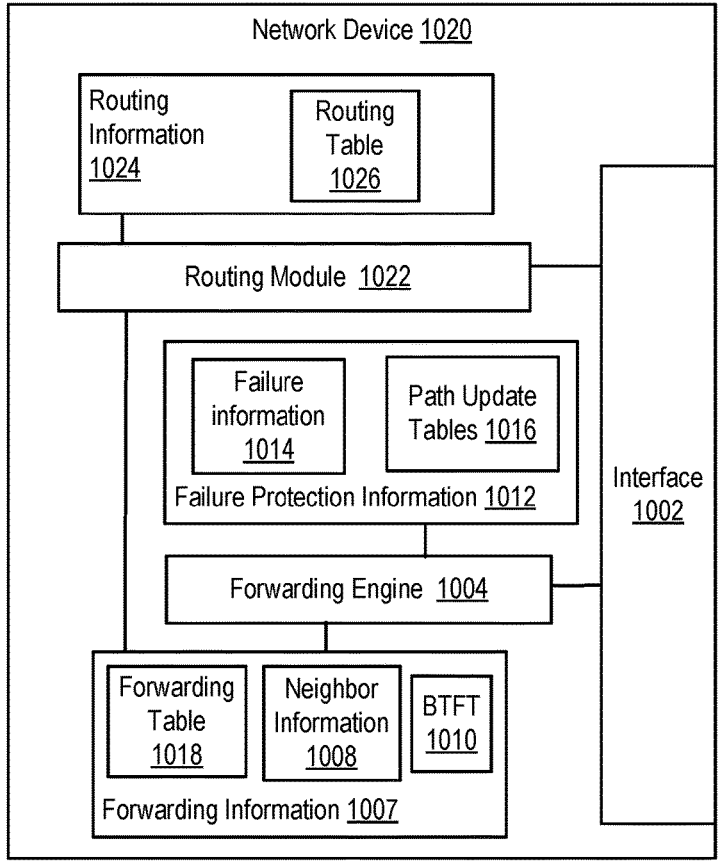

Certain components of another embodiment of a network device are illustrated by the block diagram of FIG. 10B. Network device 1020 of FIG. 10B may also be associated with a core router or egress router in network 100 of FIGS. 1 through 4. In addition to interface 1002 and forwarding engine 1004 as described above for network device 1000, network device 1020 includes a routing module 1022 and routing information 1024. In an embodiment, routing table 1026 within routing information 1024 is a unicast routing table. In the embodiment of FIG. 10B, forwarding information 1007 includes a forwarding table 1018 in addition to neighbor information 1008 and BTFT 1010 as described above for network device 1000. In an embodiment, forwarding table 1018 is a unicast forwarding table built using routing table 1016. In such an embodiment, inclusion of routing module 1022, routing information 1024 and forwarding table 1018 allows network device 1020 to perform BIER-TE forwarding over indirect, or forward-routed, links using unicast tunneling. In the embodiment of FIG. 10B, communication over interface 1002 is handled via forwarding engine 1004 and routing module 1022. In other embodiments, storing and updating of forwarding information 1007 and/or routing information 1024 may be done through separate connections to interface 1002, such as via one or more communication modules not shown in FIG. 10B.

In the embodiment of FIG. 10B, forwarding engine 1004 is also configured to use failure protection information 1012 when forwarding messages using BIER-TE. Failure protection information 1012 has the contents and uses described above in connection with FIG. 10A. In an embodiment, network device 1020 of FIG. 10B runs an IGP and at least a portion of failure information 1014 is received via IGP communications. In an embodiment, forwarding table 1018 is a unicast forwarding table and includes unicast fast-reroute backup paths. Such unicast FRR paths are distinct from the BIER-TE backup paths encoded in path update tables 1016. In an embodiment, unicast FRR paths in forwarding table 1018 are used to provide fast reroute capability during routing over indirect BIER-TE links which employ unicast routing.

Figure 10C:
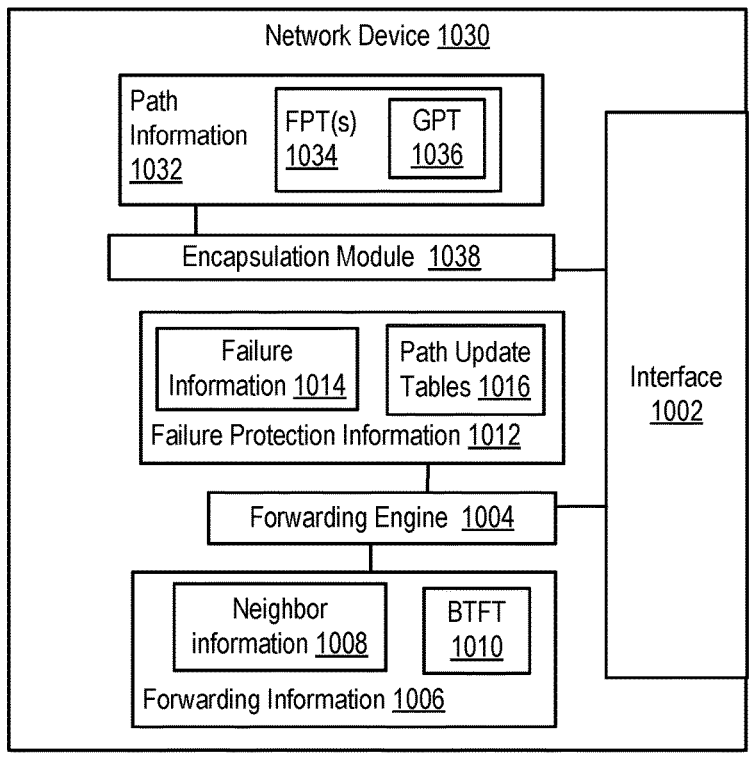

Still another embodiment of a network device is illustrated by the block diagram of FIG. 10C. In an embodiment, network device 1030 of FIG. 10C is associated with an ingress node of a BIER-TE network or domain. In addition to interface 1002, forwarding engine 1004, forwarding information 1006 and failure protection information 1012 as described above for network device 1000 of FIG. 10A, network device 1030 includes an encapsulation module 1038 and path information 1032. Encapsulation module 1038 is configured to encapsulate an incoming message with BIER-TE encapsulation including a message bit array. Path information 1032 includes the message bit arrays needed to encapsulate one or more message flows using the BIER-TE network, where a message flow may include, for example, a multicast group or a traffic-engineered unicast flow. In the embodiment of FIG. 10C, path information 1032 includes one or more flow path tables (FPTs) 1034, where the flow path tables may include a multicast group path table (GPT) 1036. Like network device 1000 of FIG. 10A, network device 1030 does not store topology or routing information in the embodiment of FIG. 10C. In an alternative embodiment, network device 1030 could include a routing module, routing information, and a forwarding table as described above for network device 1020 of FIG. 10B. In the embodiment of FIG. 10C, communication over interface 1002 is handled via forwarding engine 1004 and encapsulation module 1038. In other embodiments, storing and updating of forwarding information 1006 and/or path information 1032 may be done through separate connections to interface 1002, such as via one or more communication modules not shown in FIG. 10C.

Figure 10D:
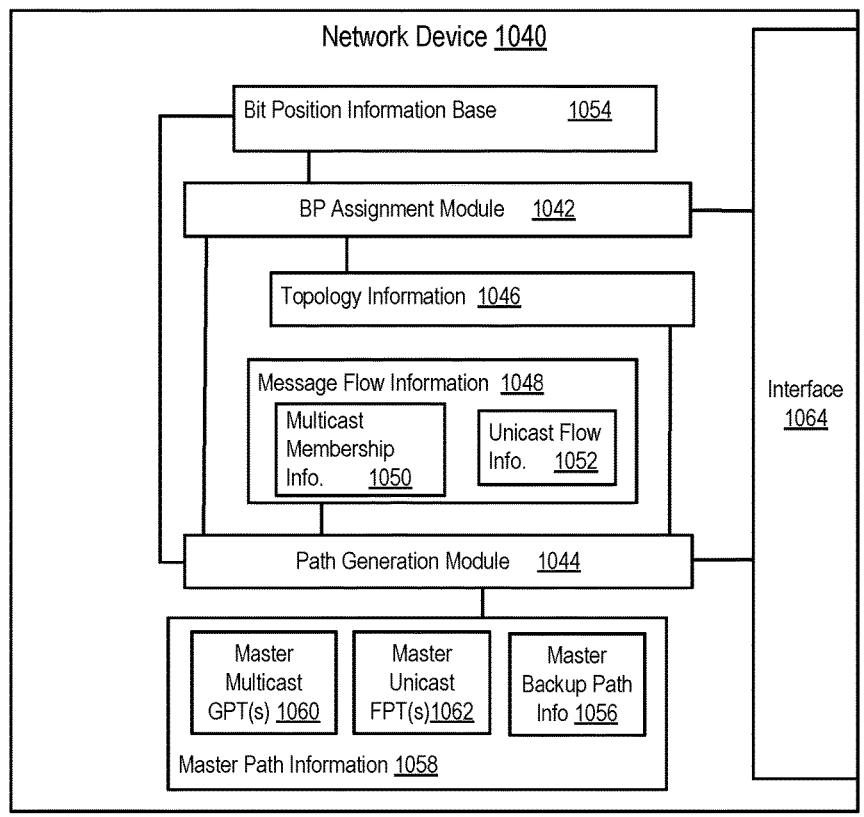

FIG. 10D illustrates certain components of an additional network device for one of the networks described herein. Network device 1040 is configured as a BIER-TE controller. In an embodiment, network device 1040 is associated with a controller host external to the data path of the BIER-TE network. In an alternative embodiment, some or all of the functions of network device 1040 are combined with those of, for example, network device 1030 and performed at an ingress node of the BIER-TE network or domain. In the embodiment of FIG. 10D, network device 1040 includes a bit position assignment module 1042 and a path generation module 1044 coupled to a communication interface 1064. In an embodiment, communication interface 1064 is configured for sending and receiving control information between network device 1040 and other network devices associated with nodes in a BIER-TE network. Communication interface 1064 may comprise multiple interfaces, and each interface may be a logical or physical interface.

Bit position assignment module 1042 is configured to assign bit positions to links within a BIER-TE network that are used to form explicit paths or trees for BIER-TE messages. In an embodiment, topology information 1046 is used by BP assignment module 1042. This topology information reflects how the nodes of the BIER-TE network or domain are connected to one another. In an embodiment, the topology information is obtained through interaction with each of the BIER-TE nodes using a control protocol. Alternatively, in an embodiment for which the BIER-TE nodes are running an IGP, topology information may be obtained by network device 1040 through IGP advertisements. In the embodiment of FIG. 10D, BP assignment module 1042 is also configured to use path-related information obtained from path generation module 1044 in assigning bit positions. BP assignment module 1042 is configured to store bit position assignments in BP information base 1054 in the embodiment of FIG. 10D. In an embodiment, BP Information Base 1054 acts as a kind of BIER-TE routing table, storing bit position assignments for links throughout the BIER-TE network or domain to which bit positions have been assigned. The information base can then be accessed by, for example, path generation module 1044 for use in determining explicit paths. In addition to storing bit position assignments at network device 1040, BP assignment module 1042 is configured to communicate to the network device at each BIER-TE node the bit position assignments relevant to that node. For example, in an embodiment for which network devices 1000 of FIG. 10A are associated with respective BIER-TE nodes, bit position assignments for the links relevant to each node are communicated to the network device for that node and stored in the corresponding BTFT.

Path generation module 1044 of network device 1040 is configured to determine the explicit path or tree for each message flow forwarded through the BIER-TE network or domain, and to represent the path or tree in a message bit array to be carried by messages in the flow. In addition to topology information 1046, path generation module 1044 is configured to use stored message flow information 1048. In the embodiment of FIG. 10D, message flow information 1048 includes multicast membership information 1050 and unicast flow information 1052. In an embodiment network device 1040 is adapted to receive multicast membership information 1050 from one or more provider edge nodes in a BIER-TE network. Multicast membership information may include multicast source and/or group information for transmissions sent by or received by hosts associated with such provider edge nodes. Network device 1040 is also adapted to receive unicast flow information 1048 from one or more provider edge nodes in some embodiments. In some embodiments network device 1040 is adapted to receive unicast flow information from a flow analysis device using a network flow protocol. In some embodiments of network device 1040 message flow information 1048 is limited to one or the other of multicast membership information 1050 or unicast flow information 1052. Multicast membership information 1050 and unicast flow information 1052 may also be combined into one table or other data structure in some embodiments. Path generation module 1044 is also configured to use bit position information base 1054 in creating a message bit array encoding each generated path or tree.

In the embodiment of FIG. 10D, path generation module 1044 stores master path information 1058, including one or more master multicast group path tables (GPTs) 1060 and one or more master unicast flow path tables (FPTs) 1062. In an embodiment, a master GPT maps message bit arrays to multicast group information for all BIER-TE multicast trees in a network or domain. The multicast groups represented in the master GPT may have different BIER-TE ingress nodes. In addition to storing message bit arrays for multicast groups in its own master GPT, network device 1040 sends message bit arrays and multicast group information to BIER-TE ingress nodes in order to populate a GPT at each ingress node containing message bit arrays for the multicast groups using that ingress node. In an embodiment, a GPT stored at a particular BIER-TE ingress node contains a subset of the message bit array information in master GPT 1060—the subset relating to the multicast groups using that ingress node. Similarly, a master FPT 1062 maps message bit arrays to identifiers of all BIER-TE traffic-engineered unicast flows in a network or domain, and network device 1040 sends message bit arrays and unicast flow information to BIER-TE ingress nodes for particular flows in order to populate an FPT at each ingress node for the flows starting at that node. In other embodiments, master path information 1058 includes only one or the other of master GPT(s) 1060 and master FPT(s) 1062. Master GPT 1060 and master FPT 1062 can also be combined into a single master FPT in some embodiments.

In the embodiment of FIG. 10D, path generation module 1044 and BP assignment module 1042 are configured to communicate with one another. As discussed above, assignment of bit positions and determination of paths are interdependent processes in some embodiments, and may proceed in an iterative manner and/or as an optimization. In an embodiment, information communicated between modules includes any of, or any combination of, bit position information, path information, or message flow information. In the embodiment of FIG. 10D, communication over interface 1064 is handled via BP assignment module 1042 and path generation module 1044. In other embodiments, storing and updating of information such as topology information 1046 and/or message flow information 1048 may be done through separate connections to interface 1064, such as via one or more communication modules not shown in FIG. 10D.

In the embodiment of FIG. 10D, master path information 1058 also includes master backup path information 1056. Master backup path information 1056 includes backup path information for protected links and/or nodes in the BIER-TE network. In an embodiment, this backup path information is used in populating path update tables at nodes configured to forward into protected links or nodes.

Figure 11:
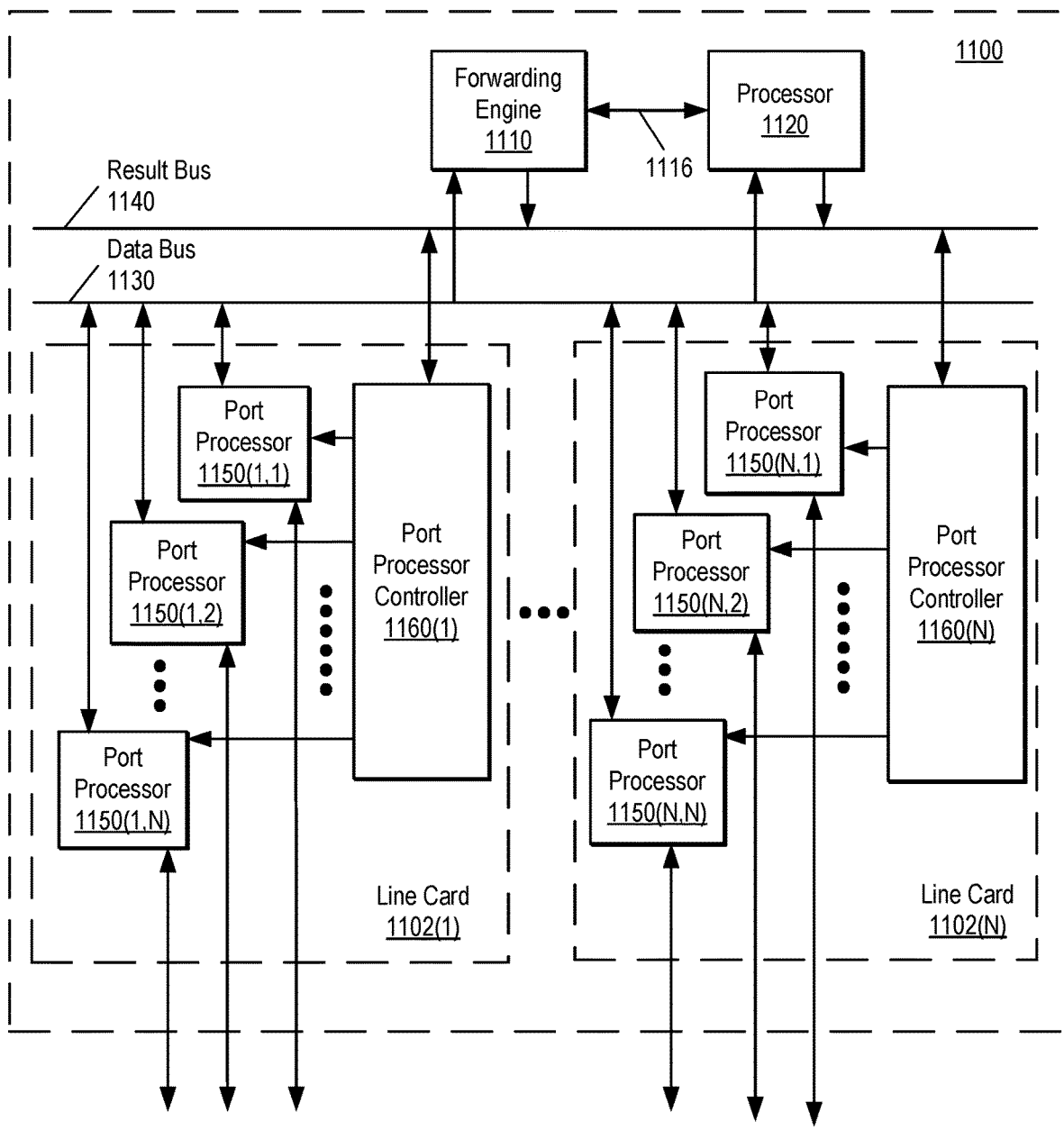
FIG. 11 is a simplified block diagram illustrating certain components of an example network device that can be employed in the networks described herein.

FIG. 11 is a block diagram illustrating certain additional and/or alternative components of nodes that can be employed in the networks described herein. In this depiction, node 1100 includes a number of line cards (line cards 1102(1)-(N)) that are communicatively coupled to a forwarding engine or packet forwarder 1110 and a processor 1120 via a data bus 1130 and a result bus 1140. Line cards 1102(1)-(N) include a number of port processors 1150(1,1)-(N, N) which are controlled by port processor controllers 1160(1)-(N). It will also be noted that forwarding engine 1110 and processor 1120 are not only coupled to one another via data bus 1130 and result bus 1140, but are also communicatively coupled to one another by a communications link 1116.

The processors 1150 and 1160 of each line card 1102 may be mounted on a single printed circuit board. When a packet or packet and header are received, the packet or packet and header may be identified and analyzed by router 1100 in the following manner. Upon receipt, a packet (or some or all of its control information) or packet and header is sent from the one of port processors 1150(1, 1)-(N, N) at which the packet or packet and header was received to one or more of those devices coupled to data bus 1130 (e.g., others of port processors 1150(1, 1)-(N, N), forwarding engine 1110 and/or processor 1120). Handling of the packet or packet and header can be determined, for example, by forwarding engine 1110. For example, forwarding engine 1110 may determine that the packet or packet and header should be forwarded to one or more of port processors 1150(1, 1)-(N, N). This can be accomplished by indicating to corresponding one(s) of port processor controllers 1160(1)-(N) that the copy of the packet or packet and header held in the given one(s) of port processors 1150(1,1)-(N,N) should be forwarded to the appropriate one of port processors 1150(1,1)-(N,N). In addition, or alternatively, once a packet or packet and header has been identified for processing, forwarding engine 1110, processor 1120 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 12:
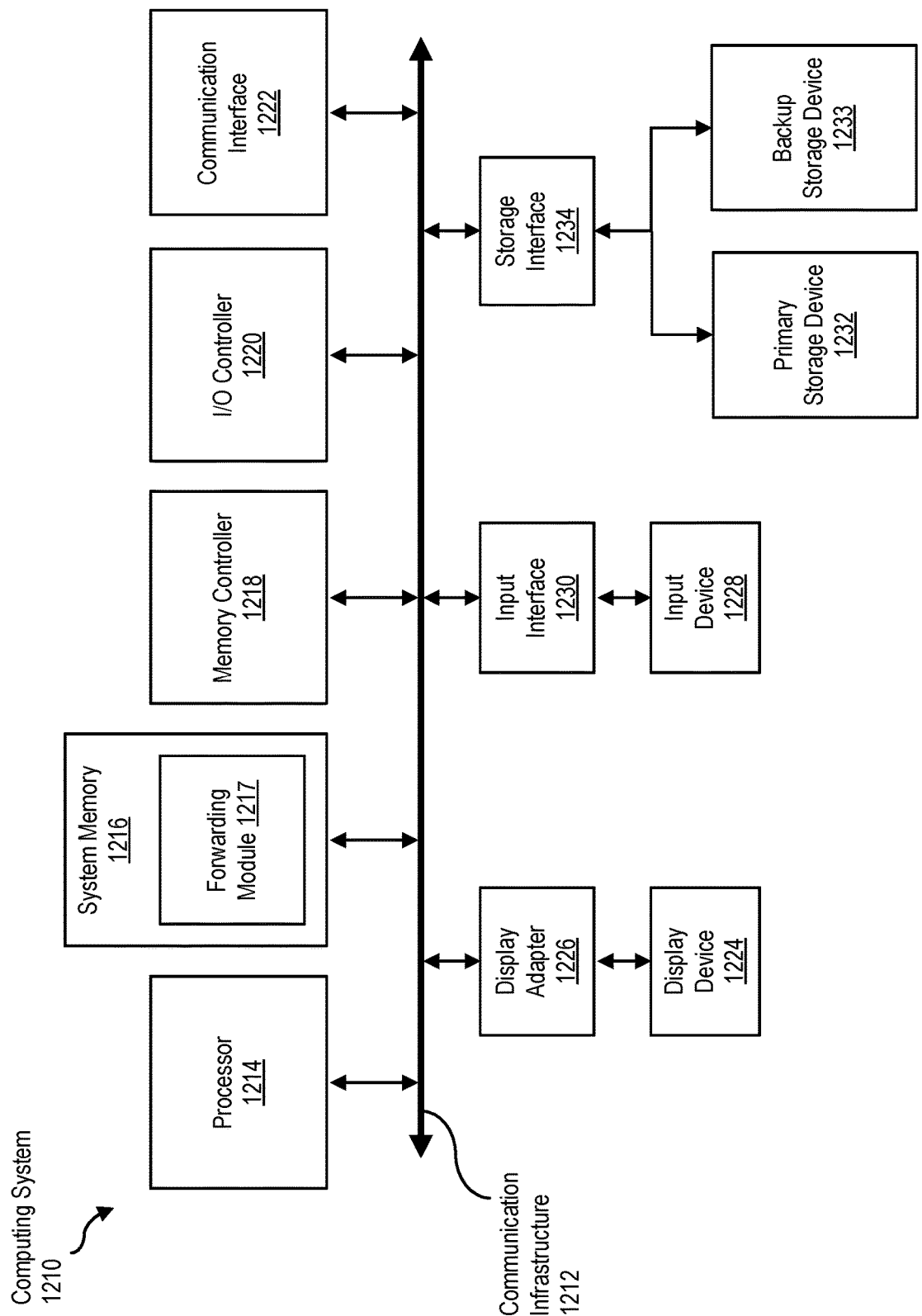
FIG. 12 is a block diagram depicting a computer system suitable for implementing embodiments of the devices and systems described herein.

FIG. 12 is a block diagram of a computing device, illustrating, for example, implementation of a forwarding module in software as described above. Computing system 1210 broadly represents any single or multi-processor computing device or system capable of executing computer-readable instructions. Examples of computing system 1210 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1210 may include at least one processor 1214 and a system memory 1216. By executing the software that implements a forwarding module 1217, computing system 1210 becomes a special purpose computing device that is configured to perform packet forwarding, in the manner described above.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the embodiments described and/or illustrated herein. For example, processor 1214 may perform and/or be a means for performing the operations described herein. Processor 1214 may also perform and/or be a means for performing any other operations, methods, or processes described and/or illustrated herein.

System memory 1216 generally represents any type or form of volatile or non-volatile storage device or medium capable of storing data and/or other computer-readable instructions. Examples of system memory 1216 include, without limitation, random access memory (RAM), read only memory (ROM), flash memory, or any other suitable memory device. Although not required, in certain embodiments computing system 1210 may include both a volatile memory unit (such as, for example, system memory 1216) and a non-volatile storage device (such as, for example, primary storage device 1232, as described further below). In one example, program instructions executable to implement a forwarding module configured to forward multicast data packets may be loaded into system memory 1216.

In certain embodiments, computing system 1210 may also include one or more components or elements in addition to processor 1214 and system memory 1216. For example, as illustrated in FIG. 12, computing system 1210 may include a memory controller 1218, an Input/Output (I/O) controller 1220, and a communication interface 1222, each of which may be interconnected via a communication infrastructure 1212. Communication infrastructure 1212 generally represents any type or form of infrastructure capable of facilitating communication between one or more components of a computing device. Examples of communication infrastructure 1212 include, without limitation, a communication bus (such as an Industry Standard Architecture (ISA), Peripheral Component Interconnect (PCI), PCI express (PCIe), or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1212. In certain embodiments, memory controller 1218 may perform and/or be a means for performing, either alone or in combination with other elements, one or more of the operations or features described and/or illustrated herein.

I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234.

Communication interface 1222 broadly represents any type or form of communication device or adapter capable of facilitating communication between computing system 1210 and one or more additional devices. For example, in certain embodiments communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1222 may also allow computing system 1210 to engage in distributed or remote computing. For example, communication interface 1222 may receive instructions from a remote device or send instructions to a remote device for execution.

As illustrated in FIG. 12, computing system 1210 may also include at least one display device 1224 coupled to communication infrastructure 1212 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1212 (or from a frame buffer) for display on display device 1224.

As illustrated in FIG. 12, computing system 1210 may also include at least one input device 1228 coupled to communication infrastructure 1212 via an input interface 1230. Input device 1228 generally represents any type or form of input device capable of providing input, either computer or human generated, to computing system 1210. Examples of input device 1228 include, without limitation, a keyboard, a pointing device, a speech recognition device, or any other input device.

As illustrated in FIG. 12, computing system 1210 may also include a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a floppy disk drive, a magnetic tape drive, an optical disk drive, a flash drive, or the like. Storage interface 1234 generally represents any type or form of interface or device for transferring data between storage devices 1232 and 1233 and other components of computing system 1210. A storage device like primary storage device 1232 can store information such as routing tables and forwarding tables.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

Many other devices or subsystems may be connected to computing system 1210. Conversely, all of the components and devices illustrated in FIG. 12 need not be present to practice the embodiments described and/or illustrated herein. The devices and subsystems referenced above may also be interconnected in different ways from that shown in FIG. 12.

Computing system 1210 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1210 for storage in memory via a network such as the Internet or upon a carrier medium.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1210 may be configured as an application specific integrated circuit (ASIC) adapted to implement one or more of the embodiments disclosed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining a protected link or node in a network, wherein
   the protected link or node is to be protected by a fast reroute procedure,
   the protected link or node is included in a designated path to be taken by a message through the network to a destination node,
   the designated path is encoded in a message bit array carried by the message, and
   assigned bit positions in the message bit array represent respective network links along the designated path;
   determining a backup path to the destination node from a feeder node adapted to forward a message carrying the message bit array into the protected link or node, wherein
   the backup path bypasses the protected link or node,
   the backup path can be encoded by a modified message bit array carried by the message in place of the message bit array, and
   assigned bit positions in the modified message bit array represent the same respective network links as the corresponding bit positions in the message bit array; and
   populating an entry in a path update table stored at the feeder node, wherein
   the entry comprises information for use, in the event of a failure of the protected link or node, in modifying two or more bit values within the message bit array to form the modified message bit array, and
   the two or more bit values comprise
   a bit value at a first bit position, in the message bit array, representing the protected link or a link to the protected node, and
   a bit value at a second bit position, in the message bit array, representing a link within the backup path but not within the designated path.

2. The method of claim 1, further comprising assigning a respective unassigned bit position in the modified message bit array to any link in the backup path not represented by a bit position in the modified message bit array.

3. The method of claim 2, further comprising updating a forwarding table at the feeder node to reflect any newly assigned bit position mappings.

4. The method of claim 1, wherein populating the entry in the path update table comprises storing an identification of the destination node.

5. The method of claim 4, wherein populating the entry in the path update table further comprises storing an identification of one or more bit positions in the message bit array at which bit values are to be reset in forming the modified message bit array.

6. The method of claim 5, wherein populating the entry in the path update table further comprises storing an identification of one or more bit positions in the message bit array at which bit values are to be set in forming the modified message bit array.

7. The method of claim 1, wherein at least one of the assigned bit positions in the message bit array does not represent an egress node of the network.

8. A network device associated with a network, the network device comprising:
a network interface; and
a processor configured to
determine a protected link or node in the network, wherein
the protected link or node is to be protected by a fast reroute procedure,
the protected link or node is included in a designated path to be taken by a message through the network to a destination node,
the designated path is encoded in a message bit array carried by the message, and
assigned bit positions in the message bit array represent respective network links along the designated path,
determine a backup path to the destination node from a feeder node adapted to forward a message carrying the message bit array into the protected link or node, wherein
the backup path bypasses the protected link or node,
the backup path can be encoded by a modified message bit array carried by the message in place of the message bit array, and
assigned bit positions in the modified message bit array represent the same respective network links as the corresponding bit positions in the message bit array, and
populate an entry in a path update table stored at the feeder node, wherein
the entry comprises information for use, in the event of a failure of the protected link or node, in modifying two or more bit values within the message bit array to form the modified message bit array, and
the two or more bit values comprise
a bit value at a first bit position, in the message bit array, representing the protected link or a link to the protected node, and
a bit value at a second bit position, in the message bit array, representing a link within the backup path but not within the designated path.

9. The network device of claim 8, wherein the processor is further configured to assign a respective unassigned bit position in the modified message bit array to any link in the backup path not represented by a bit position in the modified message bit array.

10. The network device of claim 9, further comprising a memory configured to store bit position assignment information for links in the network.

11. The network device of claim 9, wherein the processor is further configured to update a forwarding table at the feeder node to reflect any newly assigned bit position mappings.

12. The network device of claim 8, wherein the processor is further configured to store an identification of the destination node as a part of populating the entry in the path update table.

13. The network device of claim 12, wherein the processor is further configured to store an identification of one or more bit positions in the message bit array at which bit values are to be reset in forming the modified message bit array, as a part of populating the entry in the path update table.

14. The network device of claim 13, wherein the processor is further configured to store an identification of one or more bit positions in the message bit array at which bit values are to be set in forming the modified message bit array, as a part of populating the entry in the path update table.

15. A non-transitory computer readable medium comprising computer readable instructions executable to:
determine a protected link or node in a network, wherein
the protected link or node is to be protected by a fast reroute procedure,
the protected link or node is included in a designated path to be taken by a message through the network to a destination node,
the designated path is encoded in a message bit array carried by the message, and
assigned bit positions in the message bit array represent respective network links along the designated path;
determine a backup path to the destination node from a feeder node adapted to forward a message carrying the message bit array into the protected link or node, wherein
the backup path bypasses the protected link or node,
the backup path can be encoded by a modified message bit array carried by the message in place of the message bit array, and
assigned bit positions in the modified message bit array represent the same respective network links as the corresponding bit positions in the message bit array; and
populate an entry in a path update table stored at the feeder node, wherein
the entry comprises information for use, in the event of a failure of the protected link or node, in modifying two or more bit values within the message bit array to form the modified message bit array, and
the two or more bit values comprise
a bit value at a first bit position, in the message bit array, representing the protected link or a link to the protected node, and
a bit value at a second bit position, in the message bit array, representing a link within the backup path but not within the designated path.

16. The computer readable medium of claim 15, wherein the instructions are further executable to assign a respective unassigned bit position in the modified message bit array to any link in the backup path not represented by a bit position in the modified message bit array.

17. The computer readable medium of claim 16, wherein the instructions are further executable to update a forwarding table at the feeder node to reflect any newly assigned bit position mappings.

18. The computer readable medium of claim 15, wherein the instructions are further executable to store an identification of the destination node as a part of populating the entry in the path update table.

19. The computer readable medium of claim 18, wherein the instructions are further executable to store an identification of one or more bit positions in the message bit array at which bit values are to be reset in forming the modified message bit array, as a part of populating the entry in the path update table.

20. The computer readable medium of claim 19, wherein the instructions are further executable to store an identification of one or more bit positions in the message bit array at which bit values are to be set in forming the modified message bit array, as a part of populating the entry in the path update table.

* * * * *